United States Patent
Bex et al.

(10) Patent No.: US 9,758,132 B2
(45) Date of Patent: Sep. 12, 2017

(54) WIPING DEVICE, IN PARTICULAR WIPING DEVICE FOR A MOTOR VEHICLE PANE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 14/130,290

(22) PCT Filed: May 21, 2012

(86) PCT No.: PCT/EP2012/059357
§ 371 (c)(1),
(2), (4) Date: Dec. 30, 2013

(87) PCT Pub. No.: WO2013/000625
PCT Pub. Date: Jan. 3, 2013

(65) Prior Publication Data
US 2014/0130287 A1    May 15, 2014

(30) Foreign Application Priority Data

Jun. 28, 2011    (DE) .................. 10 2011 078 197

(51) Int. Cl.
*B60S 1/38*    (2006.01)
*B29C 47/00*    (2006.01)

(52) U.S. Cl.
CPC .......... *B60S 1/3881* (2013.01); *B29C 47/003* (2013.01); *B29C 47/0004* (2013.01); *B60S 1/381* (2013.01)

(58) Field of Classification Search
CPC ....... B60S 1/3806; B60S 1/381; B60S 1/3881

USPC ........................... 15/250.201, 250.43
See application file for complete search history.

(56) References Cited

U.S. PATENT DOCUMENTS

| | | | |
|---|---|---|---|
| 7,228,588 B2* | 6/2007 | Kraemer | B60S 1/381 15/250.201 |
| 7,370,385 B2* | 5/2008 | Chiang | B60S 1/38 15/250.201 |
| 2006/0156529 A1* | 7/2006 | Thomar | B60S 1/381 29/450 |
| 2007/0174989 A1 | 8/2007 | Moll et al. | |
| 2009/0089956 A1* | 4/2009 | De Block | B60S 1/3881 15/250.201 |
| 2010/0064468 A1* | 3/2010 | Kang | B60S 1/381 15/250.48 |
| 2010/0218333 A1* | 9/2010 | Ritt | B60S 1/3877 15/250.201 |

(Continued)

FOREIGN PATENT DOCUMENTS

CN    101213121    7/2008
CN    101626925    1/2010

(Continued)

OTHER PUBLICATIONS

International Search Report for Application No. PCT/EP2012/059357 dated Aug. 24, 2013 (English Translation, 3 pages).

*Primary Examiner* — Gary Graham
(74) *Attorney, Agent, or Firm* — Michael Best & Friedrich LLP

(57) ABSTRACT

The invention relates to a wiping device, in particular a wiping device for a motor vehicle pane, comprising a spoiler unit (22*a*-22*p*). According to the invention, said spoiler unit (22*a*-22*p*) is produced in a co-extrusion process.

12 Claims, 16 Drawing Sheets

(56) References Cited

U.S. PATENT DOCUMENTS

2010/0242204 A1* 9/2010 Chien .................... B60S 1/381
 15/250.201
2012/0030894 A1* 2/2012 Garrastacho ............ B60S 1/381
 15/250.201

FOREIGN PATENT DOCUMENTS

| | | |
|---|---|---|
| DE | 102005062462 A1 * | 6/2007 |
| DE | 102006020524 | 11/2007 |
| DE | 102007045253 | 4/2009 |
| EP | 2042394 | 4/2009 |
| EP | 2415645 | 2/2012 |
| FR | 2923785 | 5/2009 |
| FR | 2928887 | 9/2009 |
| WO | 2012089409 | 7/2012 |

* cited by examiner

WIPING DEVICE, IN PARTICULAR WIPING DEVICE FOR A MOTOR VEHICLE PANE

BACKGROUND OF THE INVENTION

A wiping device, in particular a wiping device for a motor vehicle pane, with a spoiler unit, is already known.

SUMMARY OF THE INVENTION

The invention is based on a wiping device, in particular a wiping device for a motor vehicle pane, with a spoiler unit.

It is proposed that the spoiler unit is produced in a co-extrusion process whereby the spoiler unit can be produced in a particularly stable manner and at the same time economically. The term "spoiler unit" in this context in particular means a unit which is provided to deflect travel wind acting on the wiping device and/or to use this to press a wiper blade onto a vehicle pane. A "co-extrusion process" in this context in particular means the merging of at least two plastic melts of different types before they leave a profile nozzle. A "wiper blade" in this context in particular is a strip which is provided to wipe a vehicle pane. Preferably the wiper blade is made of a rubber material. The term "provided" in particular should be understood as specially designed and/or equipped. Preferably the spoiler unit has at least one concave outer face.

Furthermore it is proposed that the spoiler unit has two spoiler part elements of different hardness, whereby advantageously weight can be reduced and strength increased.

Furthermore it is proposed that the harder spoiler part element terminates the spoiler unit laterally, whereby the softer spoiler part element can advantageously be protected from damage. The term "laterally" in this context is understood in particular as when viewed in the wiping direction. "Terminate" in this context in particular means cover, surround and/or conceal.

In a further embodiment of the invention, it is proposed that the softer spoiler part element has a longitudinal channel with a triangular cross section, whereby advantageously material and weight can be saved. "Triangular" in this context means a contour with three corners. The corners can also be rounded, depending on application.

If the softer spoiler part element and the harder spoiler part element are joined together by material fit over a wide area in a plane running parallel to a wiping direction, a particularly stable connection of the spoiler part elements can be achieved. The term "wiping direction" in this context in particular means the direction which extends parallel to a surface to be wiped and/or vertically to the main orientation of the wiper blade. The phrase "over a wide area" in this context in particular means over a majority of a joining area. A "majority" in this context is in particular more than 50%, preferably more than 80%.

Furthermore it is proposed that the wiping device comprises a holding unit which has a holding element with a longitudinal guidance channel to guide a spring element, wherein the holding element has at least one fixing element which is provided to couple the spoiler unit by form fit in mounted state, whereby a particularly secure mounting of the spoiler unit can be achieved. A "holding unit" in this context means in particular a unit which is provided to connect the spoiler unit with a wiper blade. A "holding element" in this context in particular means an element which is provided to connect a spoiler unit, a spring element and a wiper blade by form fit. A "fixing element" in this context is in particular an element which is provided to create a form fit with a corresponding component. A "longitudinal guidance channel" in this context in particular is a guidance channel which extends parallel to a longitudinal direction of the holding unit. Preferably the longitudinal guidance channel comprises a cavity and at least one channel wall adjacent to the cavity. A "longitudinal direction" in this context is in particular a direction which extends substantially parallel to a longitudinal extension of the holding element. A "longitudinal extension" in this context in particular means as large as possible an extension. "Substantially" in this context in particular means a deviation of less than 10°, preferably less than 5°. An "extension" of an element in this context in particular is a maximum distance between two points of a vertical projection of the element on a plane. A "spring element" in this context in particular is a spring-elastic element which has at least one extension which in normal operating state can be varied elastically by at least 10%, in particular by at least 20%, preferably by at least 30% and particularly advantageously by at least 50%, and which in particular generates a counter-force depending on the change in extension and preferably proportional to the change, which counters the change. "Coupling" in this context means connecting and/or joining.

In a main contact flow region of the wiping device, joints and hence flow resistances and/or noise can be avoided if the spoiler unit lies at least partly laterally on the holding element in the region of the longitudinal guidance channel. "Laterally" in this context in particular means viewed from the wiping direction.

Furthermore it is proposed that the holding element has at least one fixing means which with a free end faces the longitudinal guidance channel and is provided to create a form fit with the spoiler unit, whereby the wiping device can be formed in a particularly stable manner.

BRIEF DESCRIPTION OF THE DRAWINGS

Further advantages arise from the description of the drawings below. The drawings show 16 exemplary embodiments of the invention. The drawings, description and claims contain numerous features in combination. The person skilled in the art shall where applicable also consider the features individually and combine these into further sensible combinations.

The drawings show.

DETAILED DESCRIPTION

Figure 1:
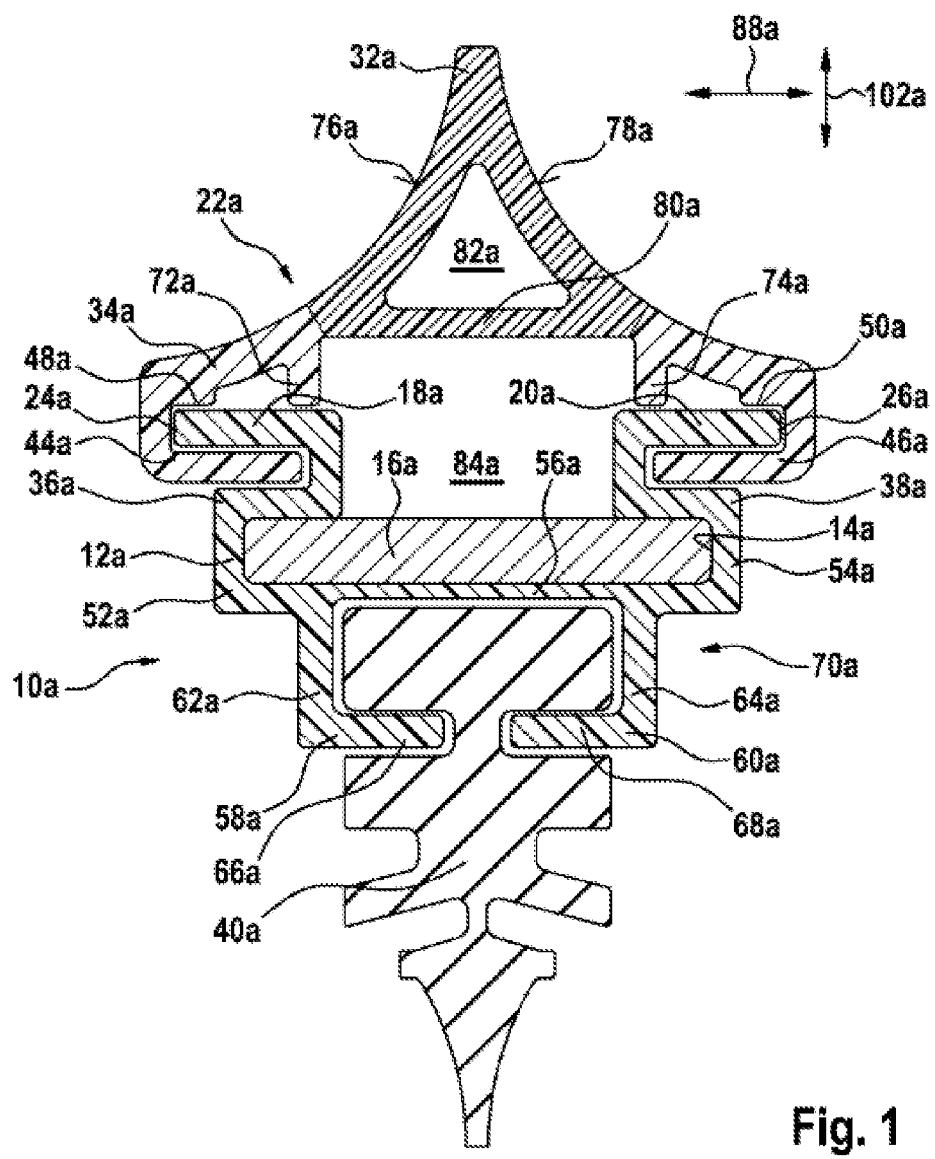
FIG. 1 a cross section view of a wiping device with a holding unit.

FIG. 1 shows a cross section view of a wiping device according to the invention with a holding unit 10a with a holding element 12a having a longitudinal guidance channel 14a to guide a spring element 16a. The section plane runs perpendicular to a longitudinal direction of the holding element 12a.

The holding element 12a has two fixing elements 18a, 20a. The fixing elements 18a, 20a are formed integrally with the holding element 12a. At their free ends 24a, 26a, the fixing elements 18a, 20a point in directions away from each other, parallel to a wiping direction 88a. Furthermore the fixing elements 18a, 20a extend in an L-shape from channel walls 36a, 38a which delimit the longitudinal guidance channel 14a. A distance between the free ends 24a, 26a is greater than a width of the longitudinal guidance channel 14a. The fixing elements 18a, 20a are provided to couple a spoiler unit 22a by form fit in a mounted state. For this the free ends 24a, 26a of the fixing elements 18a, 20a are surrounded by the spoiler unit 22a. The spoiler unit 22a has two L-shaped fixing means 44a, 46a and support bodies 48a, 50a adjacent to the fixing means 44a, 46a.

To guide the spring element 16a, side walls 52a, 54a of the longitudinal guidance channel 14a border the channel walls 36a, 38a. The channel walls 36a, 38a here enclose a right angle with the side walls 52a, 54a. Furthermore an intermediate wall 56a is arranged on the side walls 52a, 54a which terminates the longitudinal guidance channel 14a in the direction of a wiper blade 40a. The side walls 52a, 54a extend from the intermediate wall 56a in a direction away from the wiper blade 40a. The holding element 12a has a longitudinal opening 84a which opens the longitudinal guidance channel 14a towards the spoiler unit 22a.

Two L-shaped guide profiles 58a, 60a of the holding unit 10a are arranged on the intermediate wall 56a. The guide profiles 58a, 60a are formed integrally with the holding element 12a. The guide profiles 58a, 60a each have a side guide 62a, 64a and a vertical guide 66a, 68a. The vertical guides 66a, 68a enclose an angle of 90° with the respective side guides 62a, 64a. The vertical guides 66a, 68a point towards each other. The side guides 62a, 64a each enclose an angle of 90° to the intermediate wall 56a. The guide profiles 58a, 60a point in directions towards each other at their free ends of the vertical guides 66a, 68a. The guide profiles 58a, 60a and the intermediate wall 56a form a piping rail 70a in which the wiper blade 40a is introduced.

The holding element 12a is produced integrally from polyethylene in an extrusion process. A person skilled in the art in this context will consider various plastics which appear suitable such as in particular polypropylene, polyamide, polyvinyl chloride and/or polystyrene.

The spoiler unit 22a is produced in a co-extrusion process from two spoiler part elements 32a, 34a of different hardness. The first spoiler part element 32a has two spoiler sides 76a, 78a which are formed concave towards the outside. To reinforce the spoiler unit 22a, the first spoiler part element 32a has a connecting web 80a which joins together the concave spoiler sides 76a, 78a. The connecting web 80a and the spoiler sides 76a, 78a surround a longitudinal channel 82a with a triangular cross section.

The first spoiler part element 32a is formed integrally with the second spoiler part element 34a and is provided to deflect travel wind. The second spoiler part element 34a has a greater strength and hardness than the first spoiler part element 32a. The L-shaped fixing means 44a, 46a and the support bodies 48a, 50a adjacent to the fixing means 44a, 46a are molded onto the second spoiler part element 34a. The harder spoiler part element 34a surrounds the fixing elements 18a, 20a and thus terminates the holding unit 10a laterally.

Furthermore the second spoiler part element 34a has two support webs 72a, 74a. The support webs 72a, 74a lie with their free ends on the fixing elements 18a, 20a on a side facing away from the wiper blade 40a. The support webs 72a, 74a are provided for transmitting contact forces which occur at the spoiler unit 22a when exposed to travel wind. The support webs 72a, 74a extend over the entire length of the spoiler unit 22a.

The spring element 16a is let into the longitudinal guidance channel 14a. The spring element 16a is made from spring steel and is provided to form the holding unit 10a in an elastically deflectable manner.

For assembly, first the spring element 16a is introduced into the longitudinal guidance channel 14a. Then the wiper blade 40a is pushed into the piping rail 70a and creates a form fit with the holding element 12a. The spoiler unit 22a is now pushed over the fixing elements 18a, 20a and is then connected therewith by form fit.

FIGS. 2 to 16 describe 15 further exemplary embodiments of the invention. The descriptions below are substantially restricted to the differences between the exemplary embodiments, wherein with regard to components, features and functions which remain the same, reference can be made to the description of the first exemplary embodiment. To distinguish the exemplary embodiments, the letter a in the reference numerals of the exemplary embodiment in FIG. 1 is replaced by the letters b to p in the reference numerals of the exemplary embodiments in FIGS. 2 to 16. With regard to components of the same designation, in particular components with the same reference numerals, in principle reference can also be made to the drawings and/or the description of the first exemplary embodiment.

Figure 2:
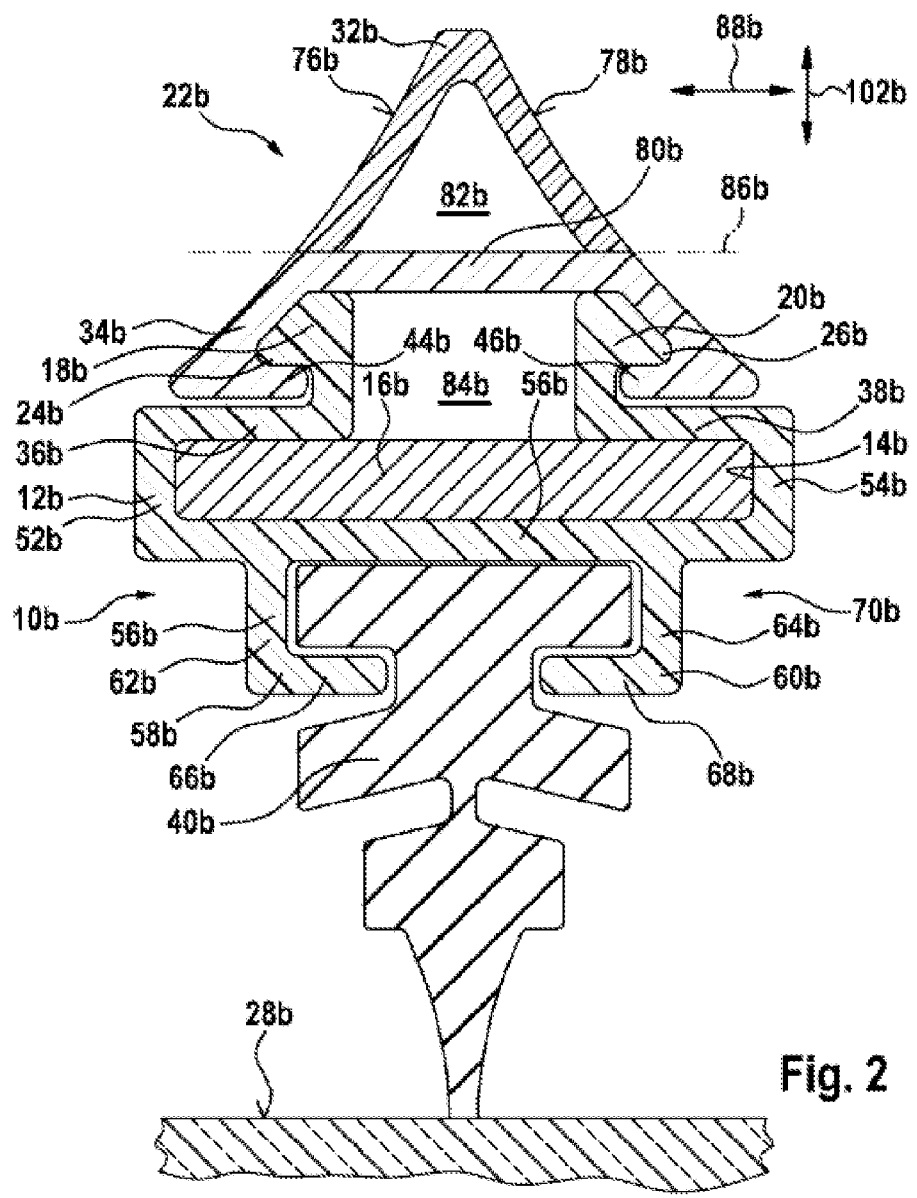
FIG. 2 a cross section view of a further exemplary embodiment of a wiping device with a holding unit.

FIG. 2 shows a cross section view of a further exemplary embodiment of a wiping device according to the invention with a holding unit 10b with a holding element 12b having a longitudinal guidance channel 14b to guide a spring element 16b. The section plane runs perpendicular to a longitudinal direction of the holding element 12b.

The holding element 12b has two fixing elements 18b, 20b. The fixing elements 18b, 20b are formed integrally with the holding element 12b. At their free ends 24b, 26b, the fixing elements 18b, 20b point in directions away from each other. Furthermore the fixing elements 18b, 20b form two channel walls 36b, 38b which border the longitudinal guidance channel 14b on a side facing away from the wiper blade. In the region of their free ends 24b, 26b, the fixing elements 18b, 20b are formed as barbs. The ends 24b, 26b are surrounded by a spoiler unit 22b. For this, the spoiler unit 22b has two fixing means 44b, 46b.

To guide the spring element 16b, side walls 52b, 54b of the longitudinal guidance channel 14b border the channel walls 36b, 38b. The channel walls 36b, 38b here enclose a right angle with the side walls 52b, 54b. Furthermore an intermediate wall 56b is arranged on the side walls 52b, 54b which terminates the longitudinal guidance channel 14b in the direction of a wiper blade 40b. The side walls 52b, 54b extend from the intermediate wall 56b in a direction away from the wiper blade 40b. The holding element 12b has a longitudinal opening 84b which opens the longitudinal guidance channel 14b towards the spoiler unit 22b.

Two L-shaped guide profiles 58b, 60b of the holding unit 10b are arranged on the intermediate wall 56b. The guide profiles 58b, 60b are formed integrally with the holding element 12b. The guide profiles 58b, 60b each have a side guide 62b, 64b and a vertical guide 66b, 68b. The vertical guides 66b, 68b enclose an angle of 90° with the respective side guides 62b, 64b. The vertical guides 66b, 68b point towards each other. The side guides 62b, 64b each enclose an angle of 90° to the intermediate wall 56b. The guide profiles 58b, 60b point in directions towards each other at their free ends of the vertical guides 66b, 68b. The guide profiles 58b, 60b and the intermediate wall 56b form a piping rail 70b in which the wiper blade 40b is introduced.

The holding element 12b is produced integrally from polyethylene in an extrusion process. A person skilled in the art in this context will consider various plastics which appear suitable such as in particular polypropylene, polyamide, polyvinyl chloride and/or polystyrene.

The spoiler unit 22b is produced in a co-extrusion process from two spoiler part elements 32b, 34b of different hardness. The first spoiler part element 32b has two spoiler sides 76b, 78b which are formed concave towards the outside.

The softer spoiler part element 32b and the harder spoiler part element 34b are joined together by material fit over a wide area in a plane 86b running parallel to a wiping direction 88b. The plane 86b extends parallel to a surface 28b to be wiped by the wiper blade 40b. To reinforce the spoiler unit 22b, the second spoiler part element 34b has a connecting web 80b which joins together the concave spoiler sides 76b, 78b. The connecting web 80b and the spoiler sides 76b, 78b are joined together by material fit and surround a longitudinal channel 82b which has a rectangular cross section.

The first spoiler part element 32b is formed integrally with the second spoiler part element 34b and is provided to deflect travel wind. The second spoiler part element 34b has a greater strength and hardness than the first spoiler part element 32b. The fixing means 44b, 46b are molded onto the second spoiler part element 34b. The fixing means 44b, 46b are formed with an acute angle and lie by form fit on the fixing elements 18b, 20b. The harder spoiler part element 34b surrounds the fixing elements 18b, 20b and thus terminates the holding unit 10b laterally. The spring element 16b is let into the longitudinal guidance channel 14b. The spring element 16b is made from spring steel and is provided to form the holding unit 10b in an elastically deflectable manner.

For assembly, first the spring element 16b is introduced into the longitudinal guidance channel 14b. Then the wiper blade 40b is pushed into the piping rail 70b and creates a form fit with the holding element 12b. The spoiler unit 22b is now pushed over the fixing elements 18b, 20b and is then connected therewith by form fit.

Figure 3:
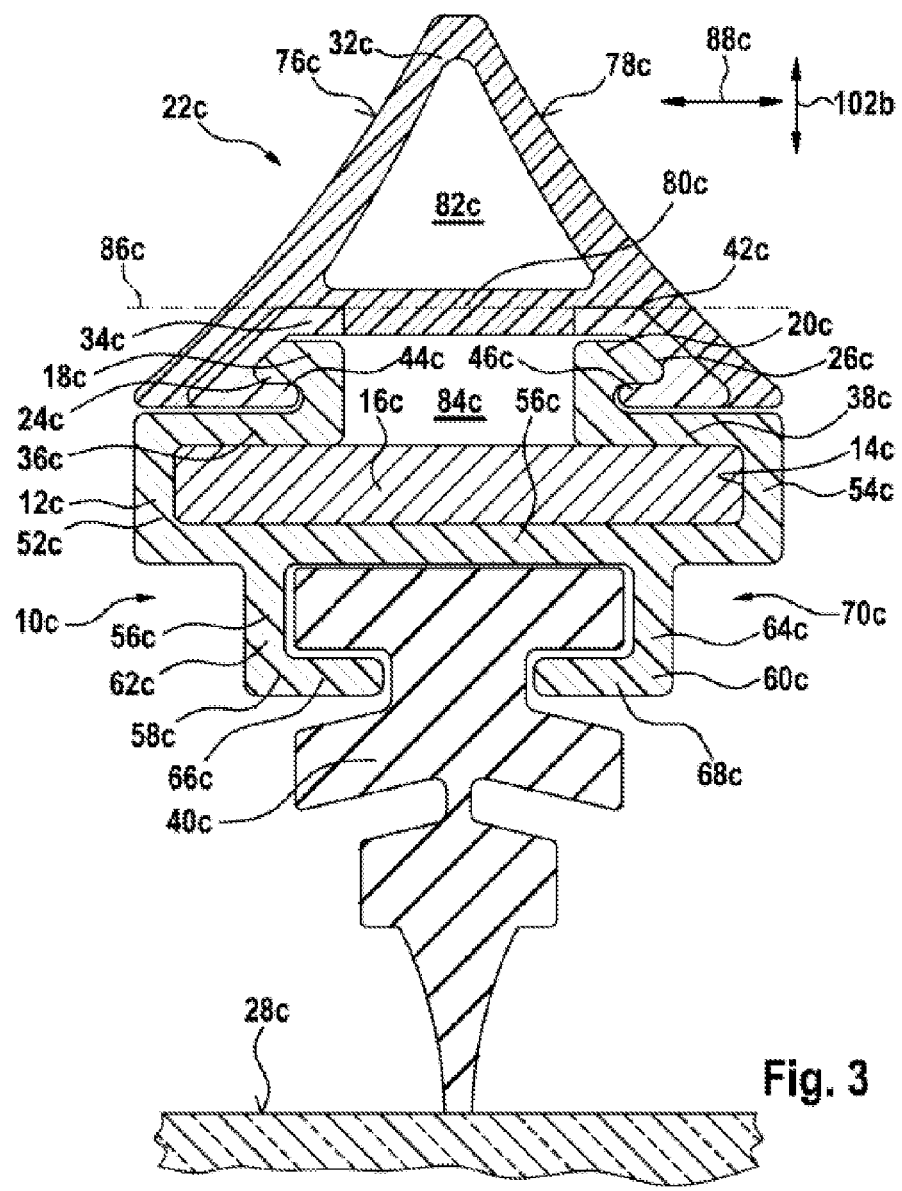
FIG. 3 a cross section view of a further exemplary embodiment of a wiping device with a holding unit.

FIG. 3 shows a cross section view of a further exemplary embodiment of a wiping device according to the invention with a holding unit 10c with a holding element 12c having a longitudinal guidance channel 14c to guide a spring element 16c. The section plane runs perpendicular to a longitudinal direction of the holding element 12c.

The holding element 12c has two fixing elements 18c, 20c. The fixing elements 18c, 20c are formed integrally with the holding element 12c. At their free ends 24c, 26c, the fixing elements 18c, 20c point in directions away from each other. Furthermore the fixing elements 18c, 20c form two channel walls 36c, 38c which border the longitudinal guidance channel 14c on a side facing away from the wiper blade. In the region of their free ends 24c, 26c, the fixing elements 18c, 20c are formed as barbs. The ends 24c, 26c are surrounded by a spoiler unit 22c. For this, the spoiler unit 22c has two fixing means 44c, 46c.

To guide the spring element 16c, side walls 52c, 54c of the longitudinal guidance channel 14c border the channel walls 36c, 38c. The channel walls 36c, 38c here enclose a right angle with the side walls 52c, 54c. Furthermore an intermediate wall 56c is arranged on the side walls 52c, 54c which terminates the longitudinal guidance channel 14c in the direction of a wiper blade 40c. The side walls 52c, 54c extend from the intermediate wall 56c in a direction away from the wiper blade 40c. The holding element 12c has a longitudinal opening 84c which opens the longitudinal guidance channel 14c towards the spoiler unit 22c.

Two L-shaped guide profiles 58c, 60c of the holding unit 10c are arranged on the intermediate wall 56c. The guide profiles 58c, 60c are formed integrally with the holding element 12c. The guide profiles 58c, 60c each have a side guide 62c, 64c and a vertical guide 66c, 68c. The vertical guides 66c, 68c enclose an angle of 90° with the respective side guides 62c, 64c. The vertical guides 66c, 68c point towards each other. The side guides 62c, 64c each enclose an angle of 90° to the intermediate wall 56c. The guide profiles 58c, 60c point in directions towards each other at their free ends of the vertical guides 66c, 68c. The guide profiles 58c, 60c and the intermediate wall 56c form a piping rail 70c in which the wiper blade 40c is introduced.

The holding element 12c is produced integrally from polyethylene in an extrusion process. A person skilled in the art in this context will consider various plastics which appear suitable such as in particular polypropylene, polyamide, polyvinyl chloride and/or polystyrene.

The spoiler unit 22c is produced in a co-extrusion process from two spoiler part elements 32c, 34c, 42c of different hardness. The first spoiler part element 32c has two spoiler sides 76c, 78c which are formed concave towards the outside. The softer spoiler part element 32c and the harder spoiler part elements 34c, 42c are joined together by material fit over a wide area in a plane 86c running parallel to a wiping direction 88c. The plane 86c extends parallel to a surface 28c to be wiped by the wiper blade 40c. To reinforce the spoiler unit 22c, the first spoiler part element 32c has a connecting web 80c which joins together the concave spoiler sides 76c, 78c. The connecting web 80c and the spoiler sides 76c, 78c are joined together by material fit and surround a longitudinal channel 82c with a triangular cross section.

The first spoiler part element 32c is formed integrally with the spoiler part elements 34c, 42c and is provided to deflect travel wind. The spoiler part elements 34c, 42c have a greater strength and hardness than the first spoiler part element 32c. The spoiler part elements 34c, 42c are formed separately from each other. The spoiler part element 34c forms the fixing means 44c. The spoiler part element 42c forms the fixing means 46c. The fixing means 44c, 46c are formed with an acute angle and lie by form fit on the fixing elements 18c, 20c. The harder spoiler part element 34c surrounds the fixing elements 18c, 20c and thus terminates the holding unit 10c laterally. The spring element 16c is let into the longitudinal guidance channel 14c. The spring element 16*c* is made from spring steel and is provided to form the holding unit 10*c* in an elastically deflectable manner.

For assembly, first the spring element 16*c* is introduced into the longitudinal guidance channel 14*c*. Then the wiper blade 40*c* is pushed into the piping rail 70*c* and creates a form fit with the holding element 12*c*. The spoiler unit 22*c* is now pushed over the fixing elements 18*c*, 20*c* and is then connected therewith by form fit.

Figure 4:
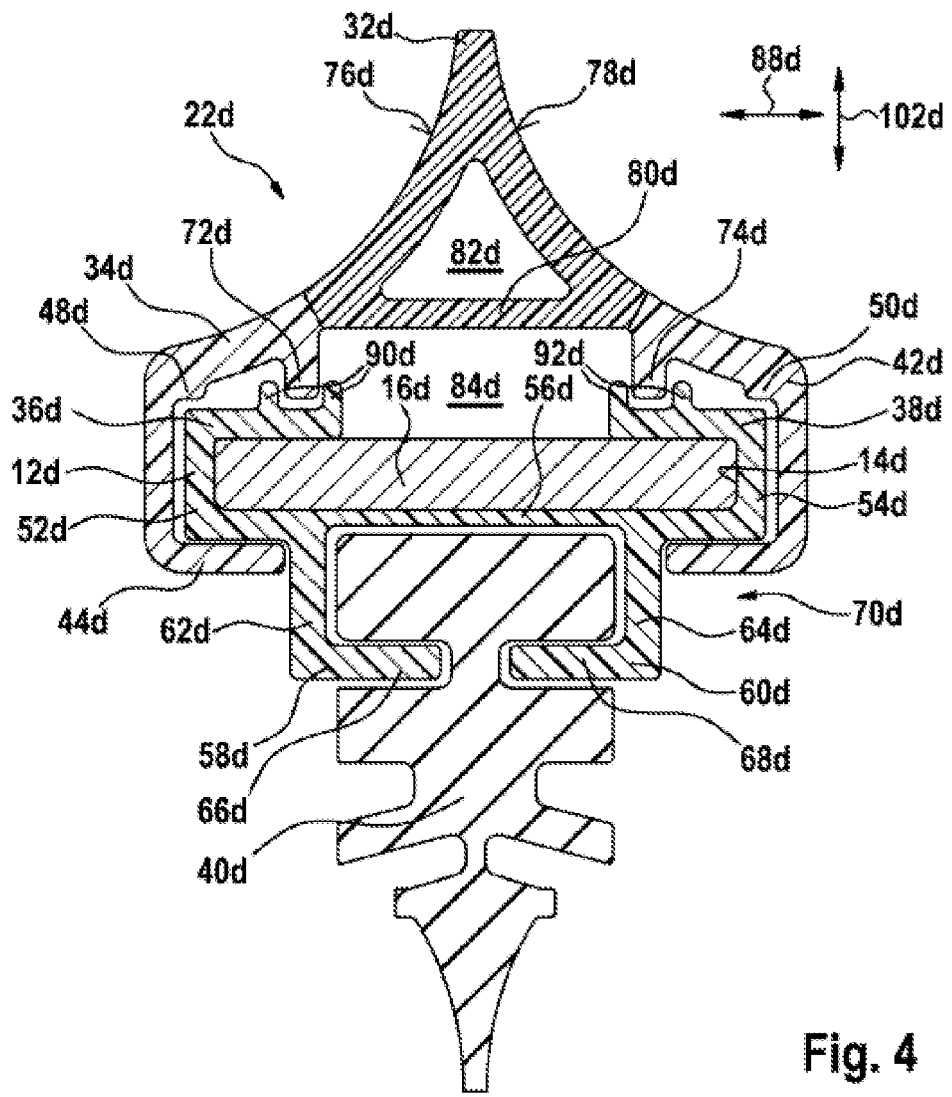
FIG. 4 a cross section view of a further exemplary embodiment of a wiping device with a holding unit.

FIG. 4 shows a cross section view of a further exemplary embodiment of a wiping device according to the invention with a holding unit 10*d* with a holding element 12*d* having a longitudinal guidance channel 14*d* to guide a spring element 16*d*, and a spoiler unit 22*d*. The section plane runs perpendicular to a longitudinal direction of the holding element 12*d*.

The holding unit 10*d* has channel walls 36*d*, 38*d* which are formed integrally with the holding element 12*d*. The channel walls 36*d*, 38*d* border the longitudinal guidance channel 14*d* on a side facing away from the wiper blade. Two longitudinal extensions 90*d*, 92*d* are arranged on each channel wall 36*d*, 38*d* on a side facing away from the wiper blade. The spoiler unit 22*d* has two L-shaped fixing means 44*d*, 46*d* and support bodies 48*d*, 50*d* adjacent to the fixing means 44*d*, 46*d*.

To guide the spring element 16*d*, side walls 52*d*, 54*d* of the longitudinal guidance channel 14*d* border the channel walls 36*d*, 38*d*. The channel walls 36*d*, 38*d* here enclose a right angle with the side walls 52*d*, 54*d*. Furthermore an intermediate wall 56*d* is arranged on the side walls 52*d*, 54*d* which terminates the longitudinal guidance channel 14*d* in the direction of a wiper blade 40*d*. The side walls 52*d*, 54*d* extend from the intermediate wall 56*d* in a direction away from the wiper blade 40*d*. The holding element 12*d* has a longitudinal opening 84*d* which opens the longitudinal guidance channel 14*d* towards the spoiler unit 22*d*.

Two L-shaped guide profiles 58*d*, 60*d* of the holding unit 10*d* are arranged on the intermediate wall 56*d*. The guide profiles 58*d*, 60*d* are formed integrally with the holding element 12*d*. The guide profiles 58*d*, 60*d* each have a side guide 62*d*, 64*d* and a vertical guide 66*d*, 68*d*. The vertical guides 66*d*, 68*d* enclose an angle of 90° with the respective side guides 62*d*, 64*d*. The vertical guides 66*d*, 68*d* point towards each other. The side guides 62*d*, 64*d* each enclose an angle of 90° to the intermediate wall 56*d*. The guide profiles 58*d*, 60*d* point in directions towards each other at their free ends of the vertical guides 66*d*, 68*d*. The guide profiles 58*d*, 60*d* and the intermediate wall 56*d* form a piping rail 70*d* in which the wiper blade 40*d* is introduced.

The holding element 12*d* is produced integrally from polyethylene in an extrusion process. A person skilled in the art in this context will consider various plastics which appear suitable such as in particular polypropylene, polyamide, polyvinyl chloride and/or polystyrene.

The spoiler unit 22*d* is produced in a co-extrusion process from two spoiler part elements 32*d*, 34*d*, 42*d* of different hardness. The first spoiler part element 32*d* has two spoiler sides 76*d*, 78*d* which are formed concave towards the outside. To reinforce the spoiler unit 22*d*, the first spoiler part element 32*d* has a connecting web 80*d* which joins together the concave spoiler sides 76*d*, 78*d*. The connecting web 80*d* and the spoiler sides 76*d*, 78*d* surround a longitudinal channel 82*d* with a triangular cross section.

The first spoiler part element 32*d* is formed integrally with the second spoiler part element 34*d*, 42*d* and is provided to deflect travel wind. The second spoiler part element 34*d*, 42*d* has a greater strength and hardness than the first spoiler part element 32*d*. The L-shaped fixing means 44*d*, 46*d* and the support bodies 48*d*, 50*d* adjacent to the fixing means 44*d*, 46*d* are molded onto the second spoiler part element 34*d*, 42*d*. The harder spoiler part element 34*d*, 42*d* surrounds the holding element 12*d* in the region of the longitudinal guidance channel 14*d*.

Furthermore the second spoiler part element 34*a*, 42*d* has two support webs 72*d*, 74*d*. The support webs 72*d*, 74*d* lie with their free ends on the channel walls 36*d*, 38*d* on a side facing away from the wiper blade 40*d*. The support webs 72*d*, 74*d* are provided for transmitting contact forces which occur at the spoiler unit 22*d* when exposed to travel wind. The support webs 72*d*, 74*d* extend over the entire length of the spoiler unit 22*d*. The longitudinal extensions 90*d*, 92*d* partially surround the support webs 72*d*, 74*d* in a wiping direction 88*d*.

The spring element 16*d* is let into the longitudinal guidance channel 14*d*. The spring element 16*d* is made from spring steel and is provided to form the holding unit 10*d* in an elastically deflectable manner.

For assembly, first the spring element 16*d* is introduced into the longitudinal guidance channel 14*d*. Then the wiper blade 40*d* is pushed into the piping rail 70*d* and creates a form fit with the holding element 12*d*. The spoiler unit 22*d* is now pushed over the holding element 12*d* and is then connected therewith by form fit.

Figure 5:
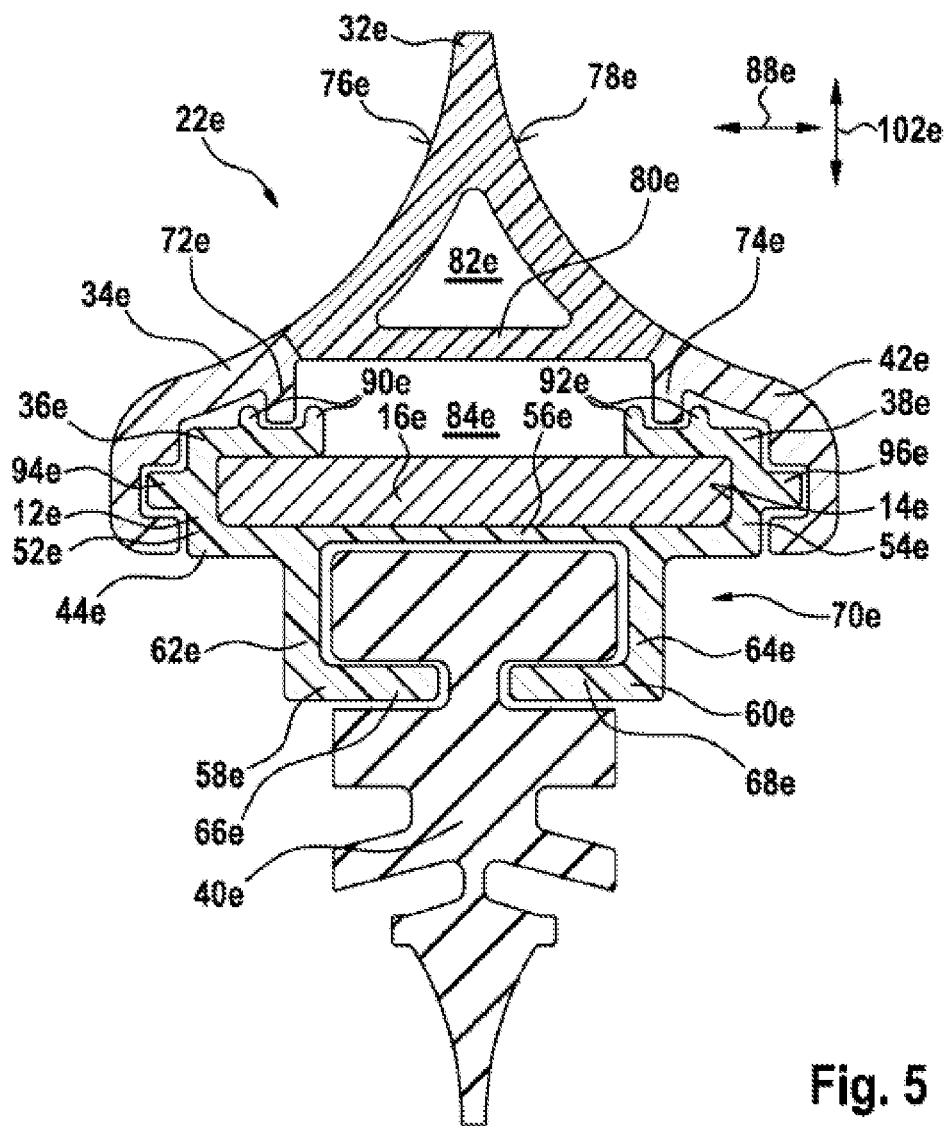
FIG. 5 a cross section view of a further exemplary embodiment of a wiping device with a holding unit.

FIG. 5 shows a cross section view of a further exemplary embodiment of a wiping device according to the invention with a holding unit 10*e* with a holding element 12*e* having a longitudinal guidance channel 14*e* to guide a spring element 16*e*. The section plane runs perpendicular to a longitudinal direction of the holding element 12*e*. The wiping device shown substantially corresponds to the exemplary embodiment shown in FIG. 4.

In the region of the longitudinal guidance channel 14*e*, a side strip 94*e*, 96*e* is molded on the holding element 12*e* on each side pointing in a wiping direction 88*e*. The side strips 94*e*, 96*e* in the mounted state create a form fit with a spoiler unit 22*e*. The form fit prevents a movement of the spoiler unit 22*e* relative to the holding element 12*e* in a vertical direction 102*e*. The vertical direction 102*e* extends perpendicular to the longitudinal direction and perpendicular to the wiping direction 88*e*.

Figure 6:
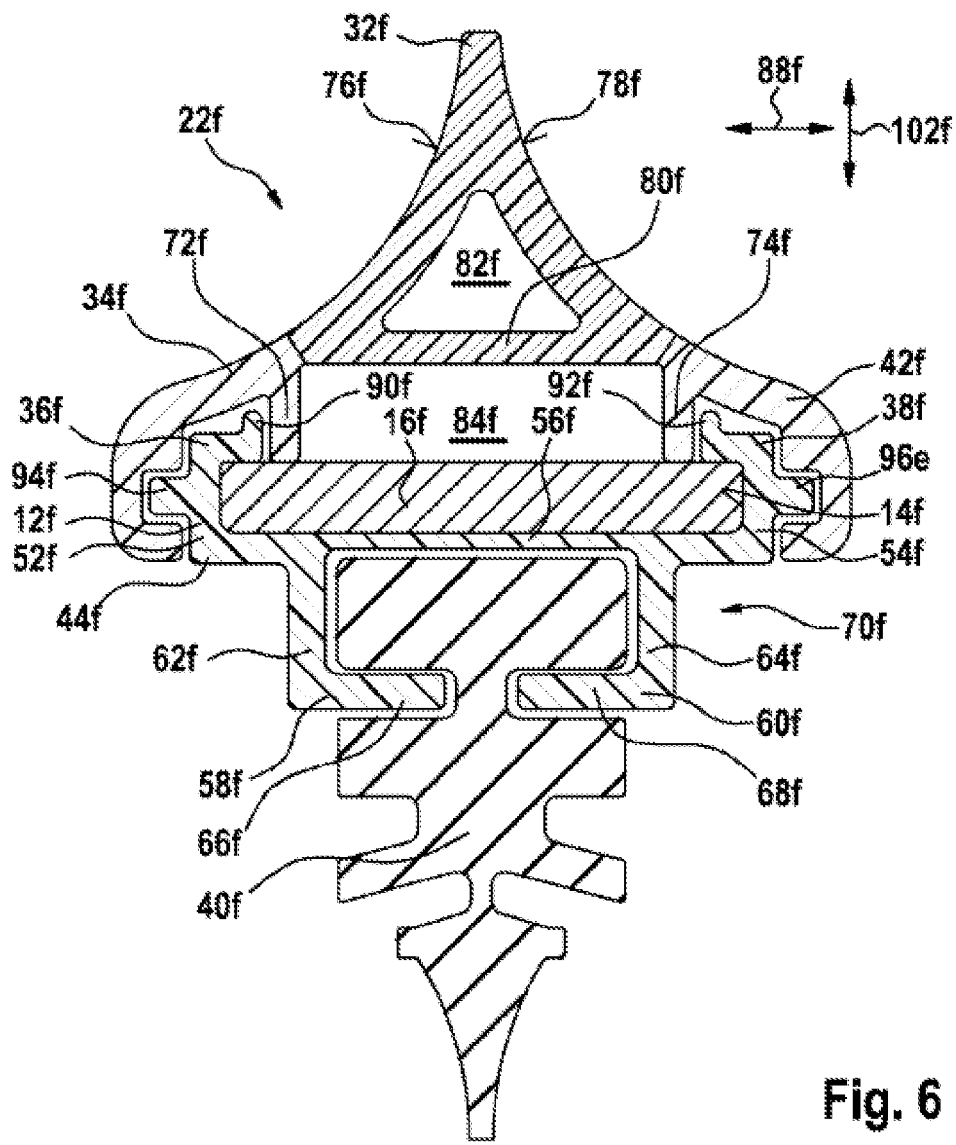
FIG. 6 a cross section view of a further exemplary embodiment of a wiping device with a holding unit.

FIG. 6 shows a cross section view of a further exemplary embodiment of a wiping device according to the invention with a holding unit 10*f* with a holding element 12*f* having a longitudinal guidance channel 14*f* to guide a spring element 16*f*. The section plane runs perpendicular to a longitudinal direction of the holding element 12*f*. The wiping device shown substantially corresponds to the exemplary embodiment shown in FIG. 4.

The holding unit 10*f* has channel walls 36*f*, 38*f* which are formed integrally with the holding element 12*f*. The channel walls 36*f*, 38*f* border the longitudinal guidance channel 14*f* on a side facing away from the wiper blade. A longitudinal extension 90*f*, 92*f* is arranged on the channel walls 36*f*, 38*f* on a side facing away from the wiper blade.

In the region of the longitudinal guidance channel 14*f*, a side strip 94*f*, 96*f* is molded on the holding element 12*f* on each side pointing in a wiping direction 88*f*. The side strips 94*f*, 96*f* in the mounted state create a form fit with a spoiler unit 22*f*. The form fit prevents a movement of the spoiler unit 22*f* relative to the holding element 12*f* in a vertical direction 102*f*. The vertical direction 102*f* extends perpendicular to the longitudinal direction and perpendicular to the wiping direction 88*f*.

The spoiler unit 22f is produced in a co-extrusion process from two spoiler part elements 32f, 34f, 42f of different hardness. The first spoiler part element 32f has two spoiler sides 76f, 78f which are formed concave towards the outside. To reinforce the spoiler unit 22f, the first spoiler part element 32f has a connecting web 80f which joins together the concave spoiler sides 76f, 78f. The connecting web 80f and the spoiler sides 76f, 78f surround a longitudinal channel 82f with a triangular cross section.

The first spoiler part element 32f is formed integrally with the second spoiler part element 34f, 42f and is provided to deflect travel wind. The second spoiler part element 34f, 42f has a greater strength and hardness than the first spoiler part element 32f. The L-shaped fixing means 44f, 46f and the support bodies 48f, 50f adjacent to the fixing means 44f, 46f are molded onto the second spoiler part element 34f, 42f. The harder spoiler part element 34f, 42f surrounds the holding element 12f in the region of the longitudinal guidance channel 14f.

Furthermore the second spoiler part element 34f, 42f has two support webs 72f, 74f. The support webs 72f, 74f lie with their free ends on the spring element 16f on a side facing away from the wiper blade 40f. The support webs 72f, 74f are provided for transmitting contact forces which occur at the spoiler unit 22f when exposed to travel wind. The support webs 72f, 74f extend over the entire length of the spoiler unit 22f. The longitudinal extensions 90f, 92f lie partially on the support webs 72f, 74f in a wiping direction 88f.

Figure 7:
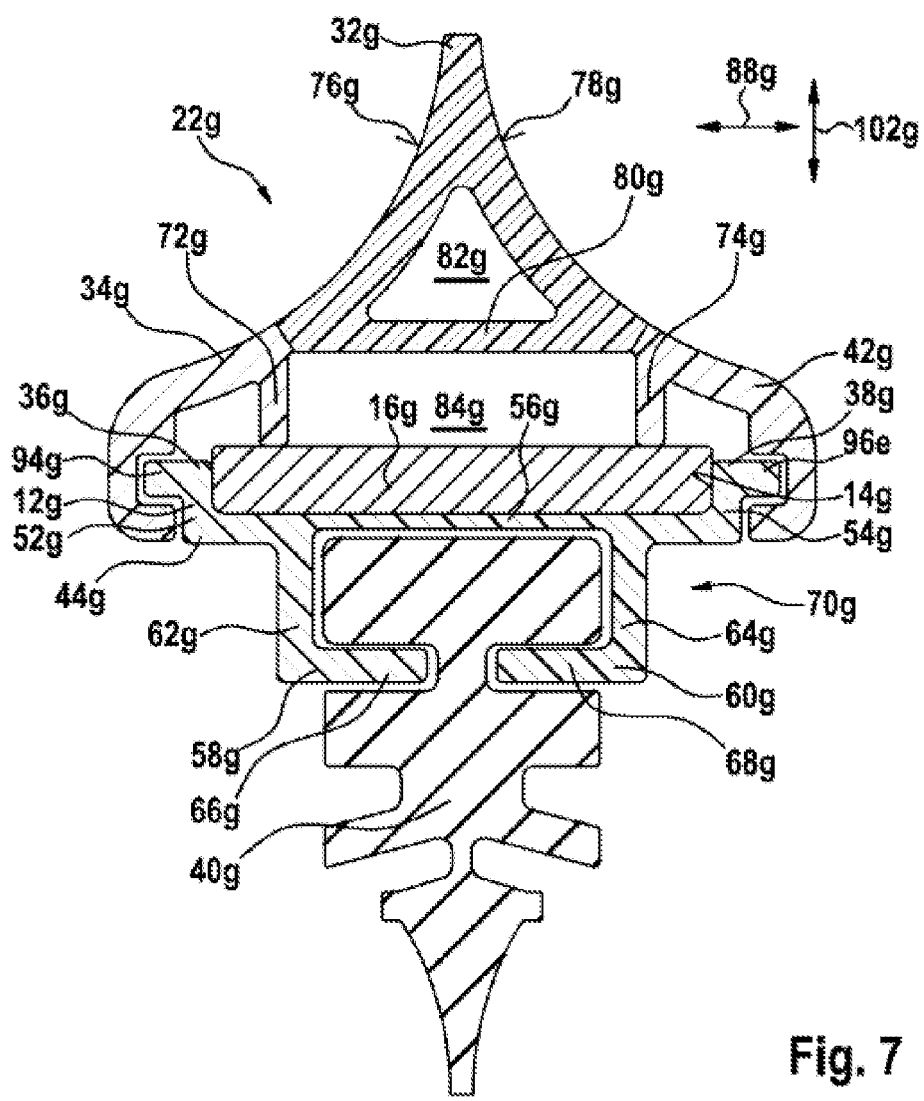
FIG. 7 a cross section view of a further exemplary embodiment of a wiping device with a holding unit.

FIG. 7 shows a cross section view of a further exemplary embodiment of a wiping device according to the invention with a holding unit 10g with a holding element 12g having a longitudinal guidance channel 14g to guide a spring element 16g, and a spoiler unit 22g. The section plane runs perpendicular to a longitudinal direction of the holding element 12g.

The longitudinal guidance channel 14g is formed as a trough. The longitudinal guidance channel 14g is open over the entire width and length in the direction of the spoiler unit 22g.

To guide the spring element 16g, the longitudinal guidance channel 14g has side walls 52g, 54g. Furthermore an intermediate wall 56g is arranged on the side walls 52g, 54g which terminates the longitudinal guidance channel 14g in the direction of a wiper blade 40g. The side walls 52g, 54g extend from the intermediate wall 56g in a direction away from the wiper blade 40g. The holding element 12g has a longitudinal opening 84g which opens the longitudinal guidance channel 14g completely towards the spoiler unit 22g.

Two L-shaped guide profiles 58g, 60g of the holding unit 10g are arranged on the intermediate wall 56g. The guide profiles 58g, 60g are formed integrally with the holding element 12g. The guide profiles 58g, 60g each have a side guide 62g, 64g and a vertical guide 66g, 68g. The vertical guides 66g, 68g enclose an angle of 90° with the respective side guides 62g, 64g. The vertical guides 66g, 68g point towards each other. The side guides 62g, 64g each enclose an angle of 90° to the intermediate wall 56g. The guide profiles 58g, 60g point in directions towards each other at their free ends of the vertical guides 66g, 68g. The guide profiles 58g, 60g and the intermediate wall 56g form a piping rail 70g in which the wiper blade 40g is introduced.

The holding element 12g is produced integrally from polyethylene in an extrusion process. A person skilled in the art in this context will consider various plastics which appear suitable such as in particular polypropylene, polyamide, polyvinyl chloride and/or polystyrene.

The spoiler unit 22g is produced in a co-extrusion process from two spoiler part elements 32g, 34g, 42g of different hardness. The first spoiler part element 32g has two spoiler sides 76g, 78g which are formed concave towards the outside. To reinforce the spoiler unit 22g, the first spoiler part element 32g has a connecting web 80g which joins together the concave spoiler sides 76g, 78g. The connecting web 80g and the spoiler sides 76g, 78g surround a longitudinal channel 82g with a triangular cross section.

The first spoiler part element 32g is formed integrally with the second spoiler part element 34g, 42g and is provided to deflect travel wind. The second spoiler part element 34g, 42g has a greater strength and hardness than the first spoiler part element 32g. The L-shaped fixing means 44g, 46g and the support bodies 48g, 50g adjacent to the fixing means 44g, 46g are molded onto the second spoiler part element 34g, 42g. The harder spoiler part element 34g, 42g surrounds the holding element 12g in the region of the longitudinal guidance channel 14g.

Furthermore the second spoiler part element 34g, 42g has two support webs 72g, 74g. The support webs 72g, 74g lie with their free ends on spring element 16g on a side facing away from the wiper blade 40g. The support webs 72g, 74g are provided for transmitting contact forces which occur at the spoiler unit 22g when exposed to travel wind. The support webs 72g, 74g extend over the entire length of the spoiler unit 22g. The support webs 72g, 74g prevent a movement of the spring element 16g in a vertical direction 102g. The vertical direction 102g extends perpendicular to the longitudinal direction and perpendicular to the wiping direction 88g.

The spring element 16g is let into the longitudinal guidance channel 14g. The spring element 16g is made from spring steel and is provided to form the holding unit 10g in an elastically deflectable manner.

For assembly, first the spring element 16g is introduced into the longitudinal guidance channel 14g. Then the wiper blade 40g is pushed into the piping rail 70g and creates a form fit with the holding element 12g. The spoiler unit 22g is now pushed over the holding element 12g and is then connected therewith by form fit.

Figure 8:
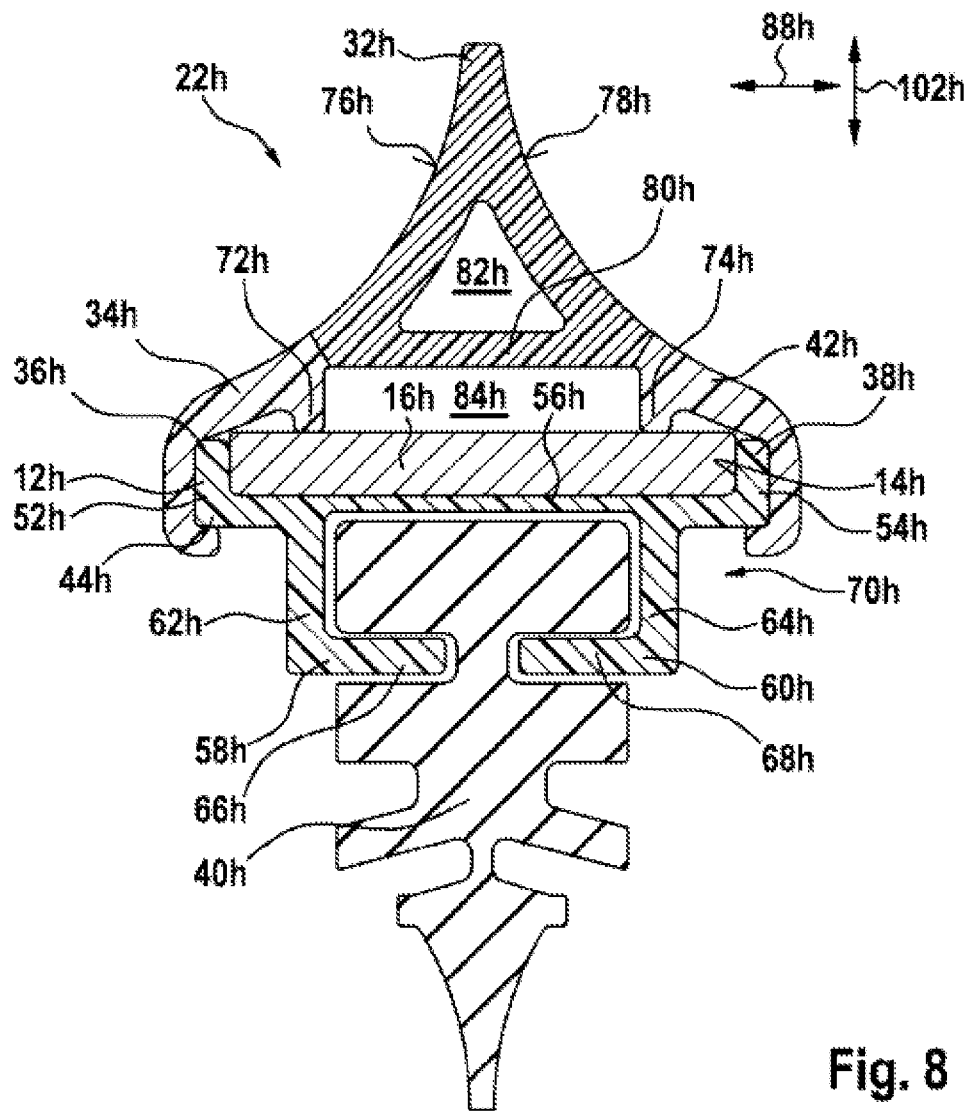
FIG. 8 a cross section view of a further exemplary embodiment of a wiping device with a holding unit.

FIG. 8 shows a cross section view of a further exemplary embodiment of a wiping device according to the invention with a holding unit 10h with a holding element 12h having a longitudinal guidance channel 14h to guide a spring element 16h, and a spoiler unit 22h. The section plane runs perpendicular to a longitudinal direction of the holding element 12h.

The longitudinal guidance channel 14h is formed as a trough. The longitudinal guidance channel 14h is open over the entire width and length in the direction of the spoiler unit 22h.

To guide the spring element 16h, the longitudinal guidance channel 14h has side walls 52h, 54h. Furthermore an intermediate wall 56h is arranged on the side walls 52h, 54h which terminates the longitudinal guidance channel 14h in the direction of a wiper blade 40h. The side walls 52h, 54h extend from the intermediate wall 56h in a direction away from the wiper blade 40h. The holding element 12h has a longitudinal opening 84h which opens the longitudinal guidance channel 14h completely towards the spoiler unit 22h.

Two L-shaped guide profiles 58h, 60h of the holding unit 10h are arranged on the intermediate wall 56h. The guide profiles 58h, 60h are formed integrally with the holding element 12h. The guide profiles 58h, 60h each have a side guide 62h, 64h and a vertical guide 66h, 68h. The vertical guides 66h, 68h enclose an angle of 90° with the respective side guides 62h, 64h. The vertical guides 66h, 68h point towards each other. The side guides 62h, 64h each enclose an angle of 90° to the intermediate wall 56h. The guide profiles 58h, 60h point in directions towards each other at their free ends of the vertical guides 66h, 68h. The guide profiles 58h, 60h and the intermediate wall 56h form a piping rail 70h in which the wiper blade 40h is introduced.

The holding element 12h is produced integrally from polyethylene in an extrusion process. A person skilled in the art in this context will consider various plastics which appear suitable such as in particular polypropylene, polyamide, polyvinyl chloride and/or polystyrene.

The spoiler unit 22h is produced in a co-extrusion process from two spoiler part elements 32h, 34h, 42h of different hardness. The first spoiler part element 32h has two spoiler sides 76h, 78h which are formed concave towards the outside. To reinforce the spoiler unit 22h, the first spoiler part element 32h has a connecting web 80h which joins together the concave spoiler sides 76h, 78h. The connecting web 80h and the spoiler sides 76h, 78h surround a longitudinal channel 82h with a triangular cross section.

The first spoiler part element 32h is formed integrally with the second spoiler part element 34h, 42h and is provided to deflect travel wind. The second spoiler part element 34h, 42h has a greater strength and hardness than the first spoiler part element 32h. The L-shaped fixing means 44h, 46h are molded onto the second spoiler part element 34h, 42h. The harder spoiler part element 34h, 42h surrounds the holding element 12h in the region of the longitudinal guidance channel 14h.

Furthermore the second spoiler part element 34h, 42h has two support webs 72h, 74h. The support webs 72h, 74h lie with their free ends on spring element 16h on a side facing away from the wiper blade 40h. The support webs 72h, 74h are provided for transmitting contact forces which occur at the spoiler unit 22h when exposed to travel wind. The support webs 72h, 74h extend over the entire length of the spoiler unit 22h. The support webs 72h, 74h prevent a movement of the spring element 16h in a vertical direction 102h. The vertical direction 102h extends perpendicular to the longitudinal direction and perpendicular to the wiping direction 88h.

The spring element 16h is let into the longitudinal guidance channel 14h. The spring element 16h is made from spring steel and is provided to form the holding unit 10h in an elastically deflectable manner.

For assembly, first the spring element 16h is introduced into the longitudinal guidance channel 14h. Then the wiper blade 40h is pushed into the piping rail 70h and creates a form fit with the holding element 12h. The spoiler unit 22h is now pushed over the holding element 12h and is then connected therewith by form fit.

Figure 9:
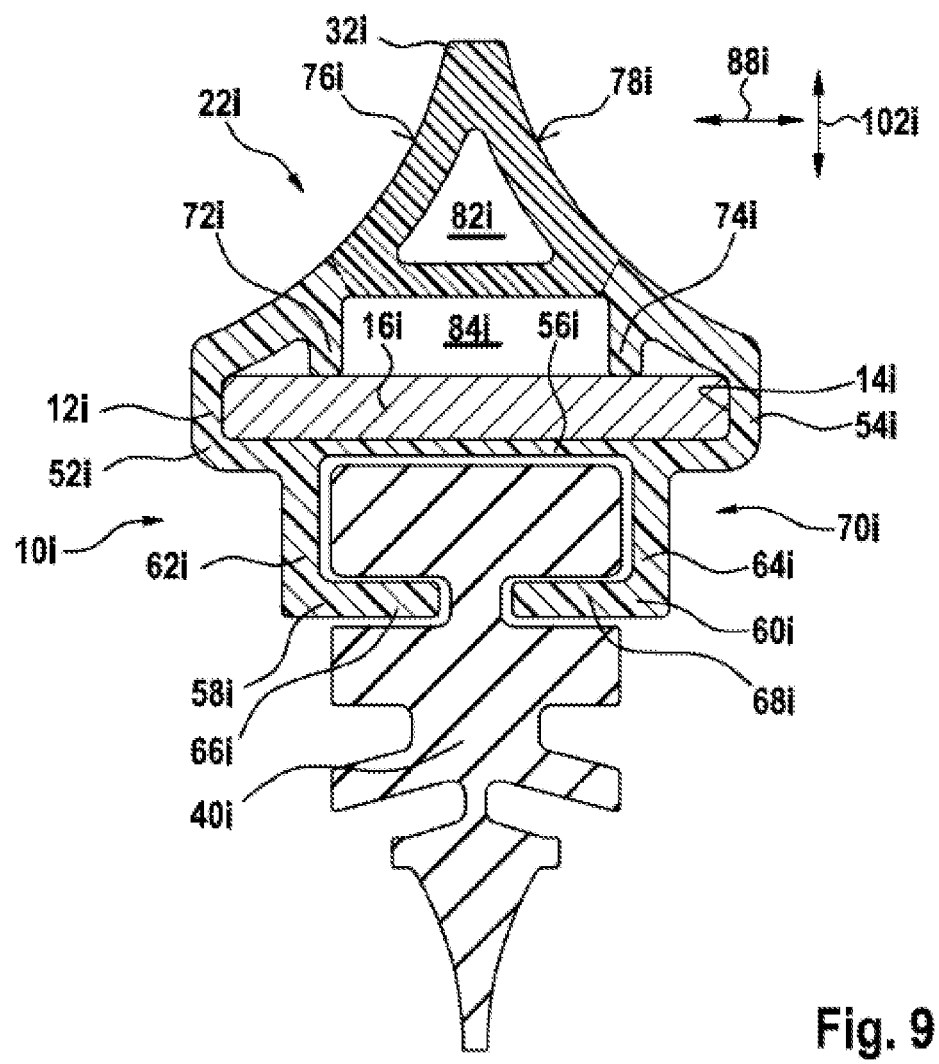
FIG. 9 a cross section view of a further exemplary embodiment of a wiping device with a holding unit.

FIG. 9 shows a cross section view of a further exemplary embodiment of a wiping device according to the invention with a holding unit 10i with a holding element 12i having a longitudinal guidance channel 14i to guide a spring element 16i, and a spoiler unit 22i. The section plane runs perpendicular to a longitudinal direction of the holding element 12i.

The longitudinal guidance channel 14i is formed as a trough. The longitudinal guidance channel 14i is open over the entire width and length in the direction of the spoiler unit 22i.

To guide the spring element 16i, the longitudinal guidance channel 14i has side walls 52i, 54i. Furthermore an intermediate wall 56i is arranged on the side walls 52i, 54i which terminates the longitudinal guidance channel 14i in the direction of a wiper blade 40i. The side walls 52i, 54i extend from the intermediate wall 56i in a direction away from the wiper blade 40i. The holding element 12i has a longitudinal opening 84i which opens the longitudinal guidance channel 14i completely towards the spoiler unit 22i.

Two L-shaped guide profiles 58i, 60i of the holding unit 10i are arranged on the intermediate wall 56i. The guide profiles 58i, 60i are formed integrally with the holding element 12i. The guide profiles 58i, 60i each have a side guide 62i, 64i and a vertical guide 66i, 68i. The vertical guides 66i, 68i enclose an angle of 90° with the respective side guides 62i, 64i. The vertical guides 66i, 68i point towards each other. The side guides 62i, 64i each enclose an angle of 90° to the intermediate wall 56i. The guide profiles 58i, 60i point in directions towards each other at their free ends of the vertical guides 66i, 68i. The guide profiles 58i, 60i and the intermediate wall 56i form a piping rail 70i in which the wiper blade 40i is introduced.

The spoiler unit 22i is produced in a co-extrusion process from two spoiler part elements 32i, 34i of different hardness. The first spoiler part element 32i has two spoiler sides 76i, 78i which are formed concave towards the outside. To reinforce the spoiler unit 22i, the first spoiler part element 32i has a connecting web 80i which joins together the concave spoiler sides 76i, 78i. The connecting web 80i and the spoiler sides 76i, 78i surround a longitudinal channel 82i with a triangular cross section.

The first spoiler part element 32i is formed integrally with the second spoiler part element 34i and is provided to deflect travel wind. The second spoiler part element 34i has a greater strength and hardness than the first spoiler part element 32i. The second spoiler part element 34i is formed integrally with the holding element 12i and made from a plastic. A person skilled in the art in this context will consider various plastics which appear suitable such as in particular polyethylene, polypropylene, polyamide, polyvinyl chloride and/or polystyrene.

Furthermore the second spoiler part element 34i has two support webs 72i, 74i. The support webs 72i, 74i lie with their free ends on spring element 16i on a side facing away from the wiper blade 40i. The support webs 72i, 74i are provided for transmitting contact forces which occur at the spoiler unit 22i when exposed to travel wind. The support webs 72i, 74i extend over the entire length of the spoiler unit 22i. The support webs 72i, 74i prevent a movement of the spring element 16i in a vertical direction 102i. The vertical direction 102i extends perpendicular to the longitudinal direction and perpendicular to the wiping direction 88i.

The spring element 16i is let into the longitudinal guidance channel 14i. The spring element 16i is made from spring steel and is provided to form the holding unit 10i in an elastically deflectable manner.

For assembly, first the spring element 16i is introduced into the longitudinal guidance channel 14i. Then the wiper blade 40i is pushed into the piping rail 70i and creates a form fit with the holding element 12i.

Figure 10:
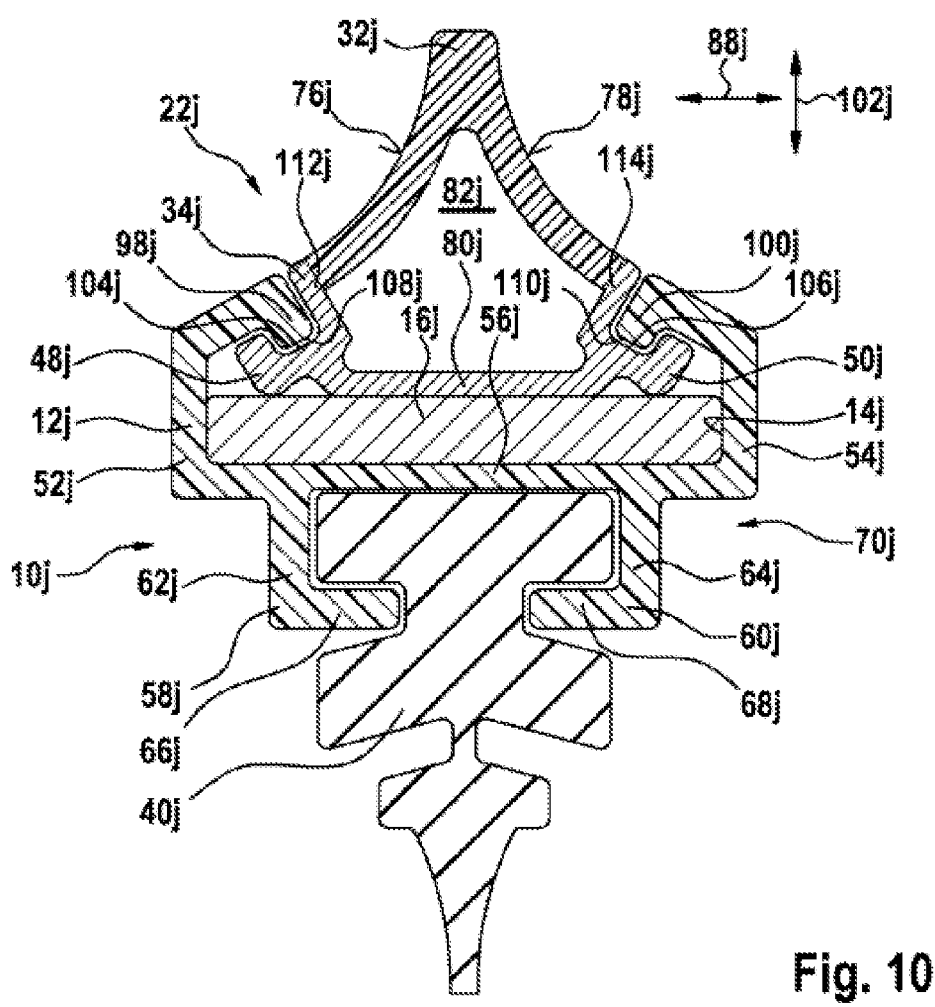
FIG. 10 a cross section view of a further exemplary embodiment of a wiping device with a holding unit.

FIG. 10 shows a cross section view of a further exemplary embodiment of a wiping device according to the invention with a holding unit 10j with a holding element 12j having a longitudinal guidance channel 14j to guide a spring element 16j, and a spoiler unit 22j. The section plane runs perpendicular to a longitudinal direction of the holding element 12j.

To guide the spring element 16j, the longitudinal guidance channel 14j has side walls 52j, 54j. Furthermore an intermediate wall 56j is arranged on the side walls 52j, 54j which terminates the longitudinal guidance channel 14j in the direction of a wiper blade 40j. The side walls 52j, 54j extend from the intermediate wall 56j in a direction away from the wiper blade 40*j*. A fixing means 98*j*, 100*j* is molded onto each side wall 52*j*, 54*j* and with its free end 108*j*, 110*j* faces the longitudinal guidance channel 14*j*. The fixing means 98*j*, 100*j* are formed L-shaped and border the side walls 52*j*, 54*j* at an obtuse angle of 60°.

Two L-shaped guide profiles 58*j*, 60*j* of the holding unit 10*j* are arranged on the intermediate wall 56*j*. The guide profiles 58*j*, 60*j* are formed integrally with the holding element 12*j*. The guide profiles 58*j*, 60*j* each have a side guide 62*j*, 64*j* and a vertical guide 66*j*, 68*j*. The vertical guides 66*j*, 68*j* enclose an angle of 90° with the respective side guides 62*j*, 64*j*. The vertical guides 66*j*, 68*j* point towards each other. The side guides 62*j*, 64*j* each enclose an angle of 90° to the intermediate wall 56*j*. The guide profiles 58*j*, 60*j* point in directions towards each other at their free ends of the vertical guides 66*j*, 68*j*. The guide profiles 58*j*, 60*j* and the intermediate wall 56*j* form a piping rail 70*j* in which the wiper blade 40*j* is introduced.

The spoiler unit 22*j* is produced in a co-extrusion process from two spoiler part elements 32*j*, 34*j* of different hardness. The first spoiler part element 32*j* has two spoiler sides 76*j*, 78*j* which are formed concave towards the outside. To reinforce the spoiler unit 22*j*, the first spoiler part element 32*j* has a connecting web 80*j* which joins together the concave spoiler sides 76*j*, 78*j*. The connecting web 80*j* and the spoiler sides 76*j*, 78*j* surround a longitudinal channel 82*j* which has a substantially pentagonal cross section.

The first spoiler part element 32*j* is formed integrally with the second spoiler part element 34*j* and is provided to deflect travel wind. The second spoiler part element 34*j* has a greater strength and hardness than the first spoiler part element 32*j*. The first spoiler part element 32*j* lies on two fixing webs 112*j*, 114*j* which are formed integrally with the connecting web 80*j*. The fixing webs 112*j*, 114*j* enclose an angle of 60° with the connecting web 80*j*. The second spoiler part element 34*j* has two fixing grooves 104*j*, 106*j* which create a form fit with the fixing means 98*j*, 100*j*.

The holding element 12*j* is produced integrally from polyethylene in an extrusion process. A person skilled in the art in this context will consider various plastics which appear suitable such as in particular polypropylene, polyamide, polyvinyl chloride and/or polystyrene.

The free ends 108*j*, 110*j* of the fixing means 98*j*, 100*j* are surrounded by the second spoiler part element 34*j*. The harder spoiler part element 34*j* here lies on the fixing means 98*j*, 100*j* by form fit. The harder spoiler part element 34*j* has two support bodies 48*j*, 50*j* which lie on the fixing means 98*j*, 100*j* and on the spring element 16*j*. A connecting web 80*j* joins the support bodies 48*j*, 50*j* together.

The spring element 16*j* is let into the longitudinal guidance channel 14*j*. The spring element 16*j* is made from spring steel and is provided to form the holding unit 10*j* in an elastically deflectable manner.

For assembly, first the spring element 16*j* is introduced into the longitudinal guidance channel 14*j*. Then the wiper blade 40*j* is pushed into the piping rail 70*j* and creates a form fit with the holding element 12*j*. The spoiler unit 22*j* is now pushed into the holding element 12*j* and is then connected therewith by form fit.

Figure 11:
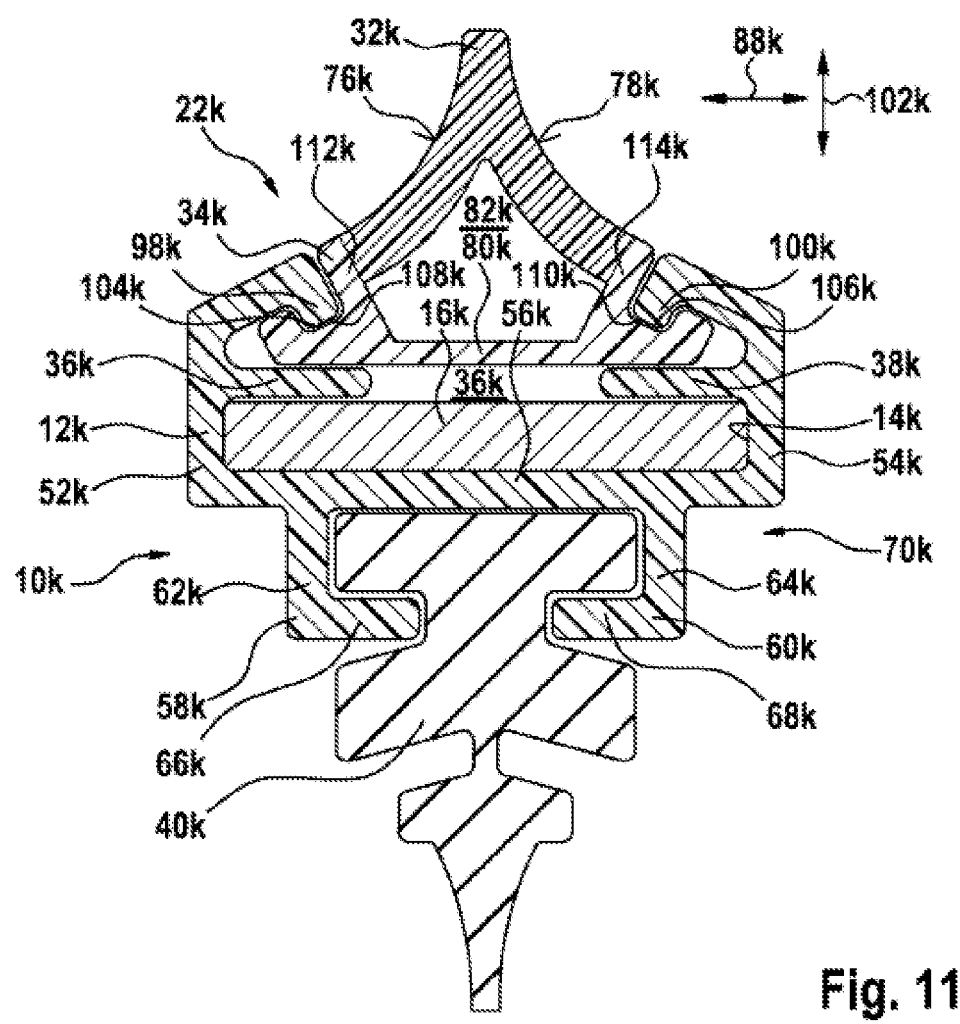
FIG. 11 a cross section view of a further exemplary embodiment of a wiping device with a holding unit.

FIG. 11 shows a cross section view of a further exemplary embodiment of a wiping device according to the invention with a holding unit 10*k* with a holding element 12*k* having a longitudinal guidance channel 14*k* to guide a spring element 16*k*, and a spoiler unit 22*k*. The section plane runs perpendicular to a longitudinal direction of the holding element 12*k*. The wiping device shown substantially corresponds to the exemplary embodiment shown in FIG. 10.

The holding element 12*k* has two channel walls 36*k*, 38*k* which border the longitudinal guidance channel 14*k*. The channel walls 36*k*, 38*k* extend parallel to a wiping direction 88*k* and partially terminate the longitudinal guidance channel 14*k* in a direction facing away from the wiper blade 40*k*. The holding element 12*k* furthermore has a longitudinal opening 84*k* which opens the longitudinal guidance channel 14*k* towards the spoiler unit 22*k*.

The spoiler unit 22*k* is produced in a co-extrusion process from two spoiler part elements 32*k*, 34*k* of different hardness. The first spoiler part element 32*k* has two spoiler sides 76*k*, 78*k* which are formed concave towards the outside. To reinforce the spoiler unit 22*k*, the first spoiler part element 32*k* has a connecting web 80*k* which joins together the concave spoiler sides 76*k*, 78*k*. The connecting web 80*k* and the spoiler sides 76*k*, 78*k* surround a longitudinal channel 82*k* which has a substantially pentagonal cross section.

The harder spoiler part element 34*k* has two support bodies 48*k*, 50*k* which lie on the fixing means 98*k*, 100*k* and on the channel walls 36*k*, 38*k*. A connecting web 80*k* joins the support bodies 48*k*, 50*k* together. The connecting web 80*k* lies on the channel walls 36*k*, 38*k*. The first spoiler part element 32*k* lies on two fixing webs 112*k*, 114*k* which are formed integrally with the connecting web 80*k*. The fixing webs 112*k*, 114*k* enclose an angle of 60° with the connecting web 80*k*. A width of the first spoiler part element 32*k* corresponds to twice the width of the fixing webs 112*k*, 114*k*.

Figure 12:
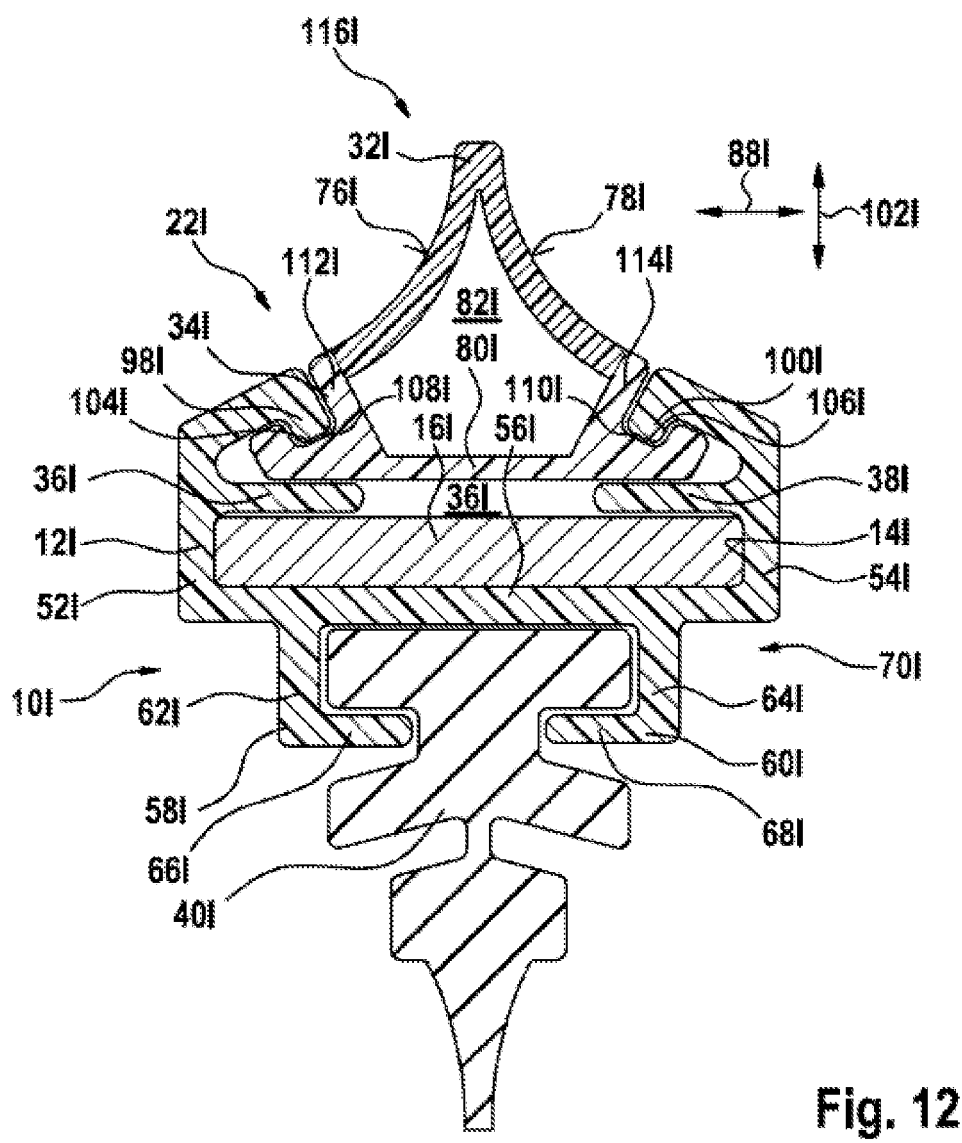
FIG. 12 a cross section view of a further exemplary embodiment of a wiping device with a holding unit.

FIG. 12 shows a cross section view of a further exemplary embodiment of a wiping device according to the invention with a holding unit 10*l* with a holding element 12*l* having a longitudinal guidance channel 14*l* to guide a spring element 16*l*. The section plane runs perpendicular to a longitudinal direction of the holding element 12*l*. The wiping device shown substantially corresponds to the exemplary embodiment shown in FIG. 11. A width of a first spoiler part element 32*l* corresponds to the width of the fixing webs 112*l*, 114*l*. The first spoiler part element 32*l* runs together pointed in an end region 116*l* facing away from the wiper blade 40*l*.

Figure 13:
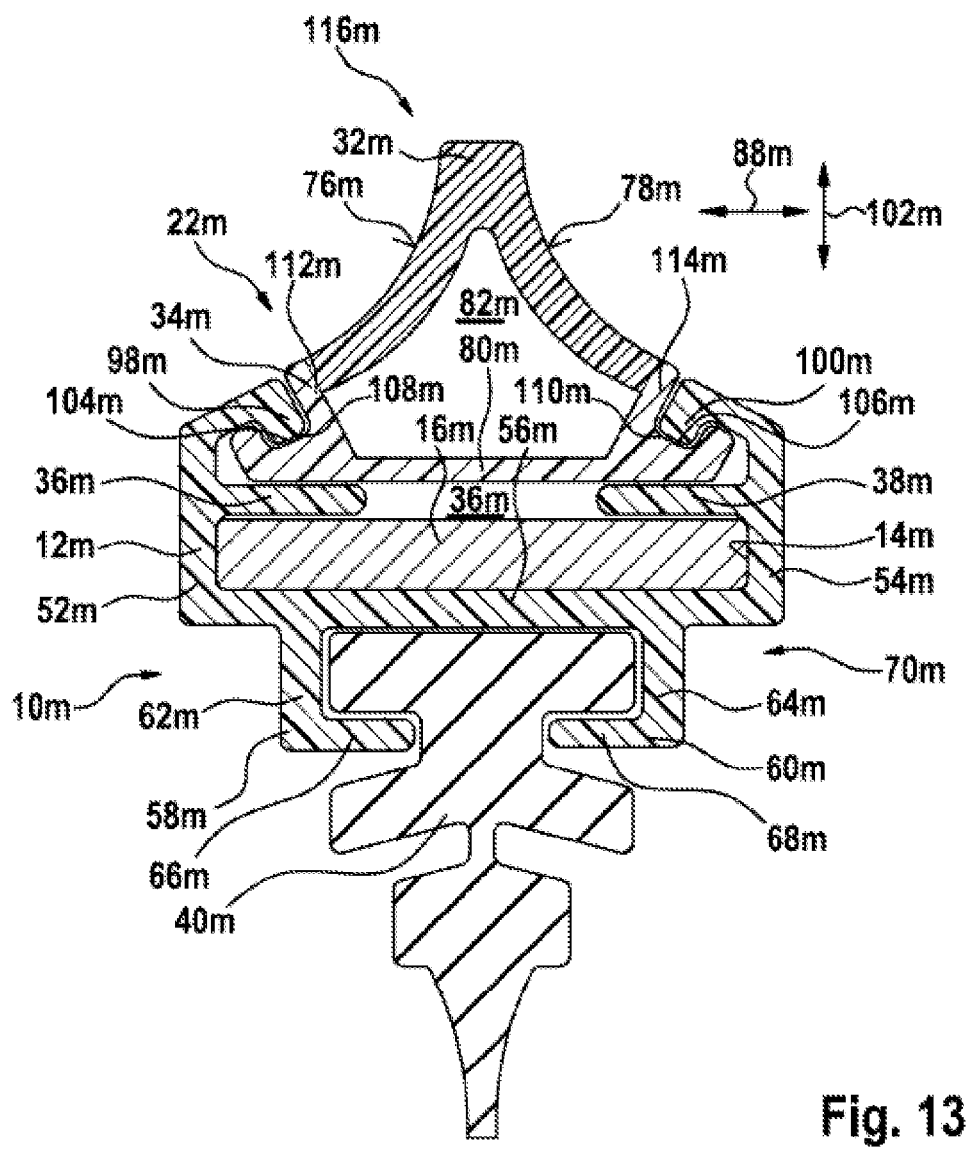
FIG. 13 a cross section view of a further exemplary embodiment of a wiping device with a holding unit.

FIG. 13 shows a cross section view of a further exemplary embodiment of a wiping device according to the invention with a holding unit 10*m* with a holding element 12*m* having a longitudinal guidance channel 14*m* to guide a spring element 16*m*, and a spoiler unit 22*m*. The section plane runs perpendicular to a longitudinal direction of the holding element 12*m*. The wiping device shown substantially corresponds to the exemplary embodiment shown in FIG. 12. A width of a first spoiler part element 32*m* corresponds to the width of the fixing webs 112*m*, 114*m*. The first spoiler part element 32*m* runs together rounded in an end region 116*m* facing away from a wiper blade 40*m*.

Figure 14:
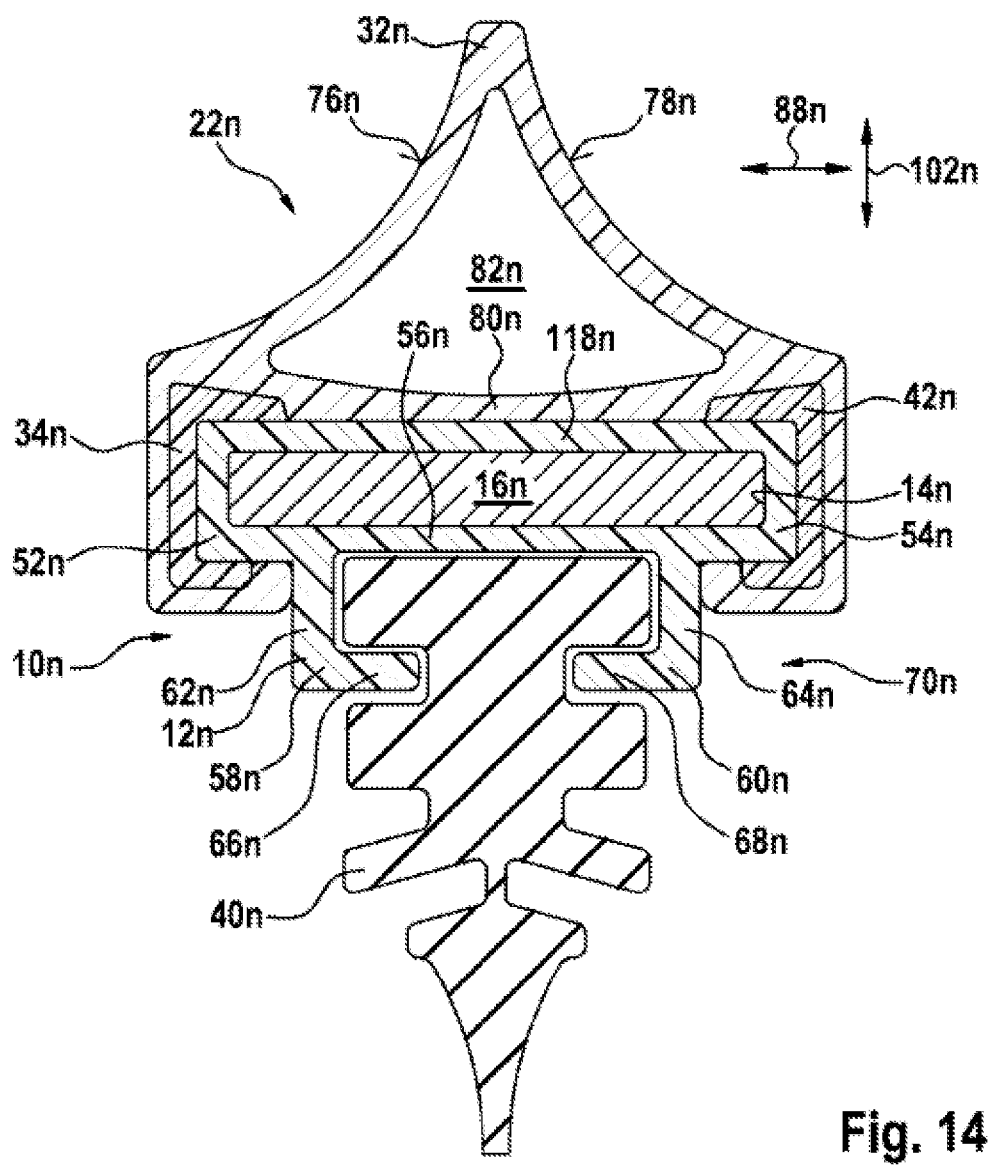
FIG. 14 a cross section view of a further exemplary embodiment of a wiping device with a holding unit.

FIG. 14 shows a cross section view of a further exemplary embodiment of a wiping device according to the invention with a holding unit 10*n* with a holding element 12*n* having a longitudinal guidance channel 14*n* to guide a spring element 16*n*. The section plane runs perpendicular to a longitudinal direction of the holding element 12*n*.

To guide the spring element 16*n*, the longitudinal guidance channel 14*n* has side walls 52*n*, 54*n*. Furthermore an intermediate wall 56*n* is arranged on the side walls 52*n*, 54*n* which terminates the longitudinal guidance channel 14*n* in the direction of a wiper blade 40*n*. The side walls 52*n*, 54*n* extend from the intermediate wall 56*n* in a direction away from the wiper blade 40*n*. A second intermediate wall 118*n* terminates the longitudinal guidance channel 14*n* in the direction of a spoiler unit 22*n*. Thus the longitudinal guidance channel 14*n* is completely surrounded.

Two L-shaped guide profiles 58n, 60n of the holding unit 10n are arranged on the intermediate wall 56n. The guide profiles 58n, 60n are formed integrally with the holding element 12n. The guide profiles 58n, 60n each have a side guide 62n, 64n and a vertical guide 66n, 68n. The vertical guides 66n, 68n enclose an angle of 90° with the respective side guides 62n, 64n. The vertical guides 66n, 68n point towards each other. The side guides 62n, 64n each enclose an angle of 90° to the intermediate wall 56n. The guide profiles 58n, 60n point in directions towards each other at their free ends of the vertical guides 66n, 68n. The guide profiles 58n, 60n and the intermediate wall 56n form a piping rail 70n in which the wiper blade 40n is introduced.

The spoiler unit 22n is produced in a co-extrusion process from two spoiler part elements 32n, 34n, 42n of different hardness. The first spoiler part element 32n has two spoiler sides 76n, 78n which are formed concave towards the outside. To reinforce the spoiler unit 22n, the first spoiler part element 32n has a connecting web 80n which joins together the concave spoiler sides 76n, 78n. The connecting web 80n and the spoiler sides 76n, 78n surround a longitudinal channel 82n which has a substantially pentagonal cross section.

The first spoiler part element 32n is formed integrally with the second spoiler part element 34n, 42n and is provided to deflect travel wind. The second spoiler part element 34n, 42n has a greater strength and hardness than the first spoiler part element 32n.

The second spoiler part elements 34n, 42n lie on the holding element 12n by form fit in the region of the longitudinal guidance channel 14n and partially surround the longitudinal guidance channel 14n. The second spoiler part elements 34n, 42n each have three walls. The first and second walls enclose an angle of 90°. The second wall encloses an angle of 77° with the third wall, which can lead to a high torsional rigidity.

The second spoiler part elements 34n, 42n are surrounded by the first spoiler part element 32n in both a wiping direction 88n and a vertical direction 102n. Contact of the second spoiler part elements 34n, 42n with an environment is thus avoided.

The holding element 12n is produced integrally from polyethylene in an extrusion process. A person skilled in the art in this context will consider various plastics which appear suitable such as in particular polypropylene, polyamide, polyvinyl chloride and/or polystyrene.

The spring element 16n is let into the longitudinal guidance channel 14n. The spring element 16n is made from spring steel and is provided to form the holding unit 10n in an elastically deflectable manner.

For assembly, first the spring element 16n is introduced into the longitudinal guidance channel 14n. Then the wiper blade 40n is pushed into the piping rail 70n and creates a form fit with the holding element 12n. The spoiler unit 22n is now pushed over the holding element 12n and is then connected therewith by form fit.

Figure 15:
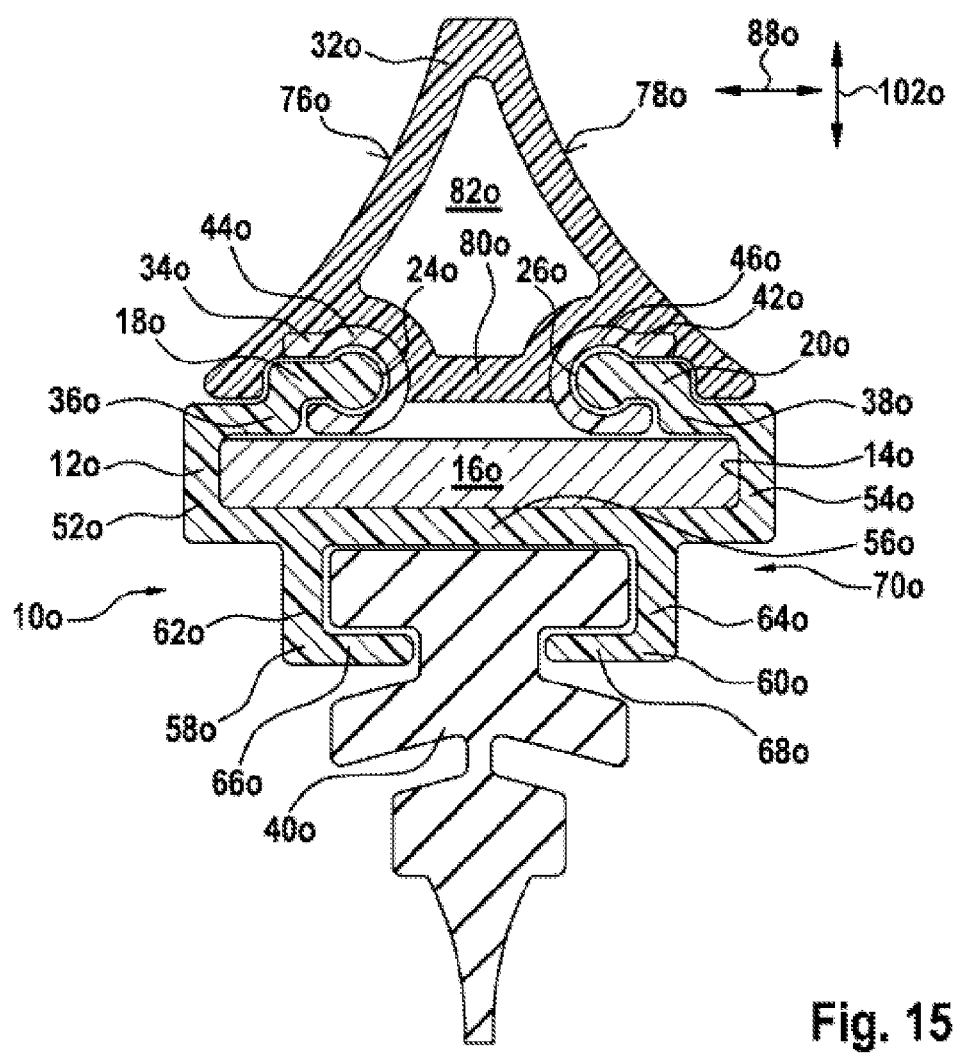
FIG. 15 a cross section view of a further exemplary embodiment of a wiping device with a holding unit.

FIG. 15 shows a cross section view of a further exemplary embodiment of a wiping device according to the invention with a holding unit 10o with a holding element 12o having a longitudinal guidance channel 14o to guide a spring element 16o. The section plane runs perpendicular to a longitudinal direction of the holding element 12o.

The holding element 12o has two fixing elements 18o, 20o. The fixing elements 18o, 20o are formed integrally with the holding element 12o. At their free ends 24o, 26o, the fixing elements 18o, 20o point in directions away from each other. Furthermore the fixing elements 18o, 20o form two channel walls 36o, 38o which border the longitudinal guidance channel 14o on a side facing away from the wiper blade. In the region of their free ends 24o, 26o, the fixing elements 18o, 20o are formed as piping. The ends 24o, 26o are surrounded by a spoiler unit 22o. For this the spoiler unit 22o has two fixing means 44o, 46o. The fixing means 44o, 46o each form a C-shaped receiving region and hence a piping rail.

To guide the spring element 16o, side walls 52o, 54o of the longitudinal guidance channel 14o border the channel walls 36o, 38o. The channel walls 36o, 38o here enclose a right angle with the side walls 52o, 54o. Furthermore an intermediate wall 56o is arranged on the side walls 52o, 54o which terminates the longitudinal guidance channel 14o in the direction of a wiper blade 40o. The side walls 52o, 54o extend from the intermediate wall 56o in a direction away from the wiper blade 40o. The holding element 12o has a longitudinal opening 84o which opens the longitudinal guidance channel 14o towards the spoiler unit 22o.

Two L-shaped guide profiles 58o, 60o of the holding unit 10o are arranged on the intermediate wall 56o. The guide profiles 58o, 60o are formed integrally with the holding element 12o. The guide profiles 58o, 60o each have a side guide 62o, 64o and a vertical guide 66o, 68o. The vertical guides 66o, 68o enclose an angle of 90° with the respective side guides 62o, 64o. The vertical guides 66o, 68o point towards each other. The side guides 62o, 64o each enclose an angle of 90° to the intermediate wall 56o. The guide profiles 58o, 60o point in directions towards each other at their free ends of the vertical guides 66o, 68o. The guide profiles 58o, 60o and the intermediate wall 56o form a piping rail 70o in which the wiper blade 40o is introduced.

The holding element 12o is produced integrally from polyethylene in an extrusion process. A person skilled in the art in this context will consider various plastics which appear suitable such as in particular polypropylene, polyamide, polyvinyl chloride and/or polystyrene.

The spoiler unit 22o is produced in a co-extrusion process from two spoiler part elements 32o, 34o, 42o of different hardness. The first spoiler part element 32o has two spoiler sides 76o, 78o which are formed concave towards the outside. The softer spoiler part element 32o and the harder spoiler part elements 34o, 42o are joined together by material fit over a wide area. To reinforce the spoiler unit 22o, the first spoiler part element 32o has a connecting web 80o which joins together the concave spoiler sides 76o, 78o. The softer spoiler part element 32o surrounds a longitudinal channel 82o which has a pentagonal cross section.

The first spoiler part element 32o is formed integrally with the second spoiler part elements 34o, 42o and is provided to deflect travel wind. The spoiler part elements 34o, 42o have a greater strength and hardness than the first spoiler part element 32o. The spoiler part elements 34o, 42o are formed separately from each other. The spoiler part element 34o forms the fixing means 44o. The spoiler part element 42o forms the fixing means 46o. The fixing means 44o, 46o are formed circular and lie by form fit on the fixing elements 18o, 20o. The spring element 16o is let into the longitudinal guidance channel 14o. The spring element 16o is made from spring steel and is provided to form the holding unit 10o in an elastically deflectable manner.

For assembly, first the spring element 16o is introduced into the longitudinal guidance channel 14o. Then the wiper blade 40o is pushed into the piping rail 70o and creates a form fit with the holding element 12o. The spoiler unit 22o is now pushed over the fixing elements 18o, 20o and is then connected therewith by form fit.

Figure 16:
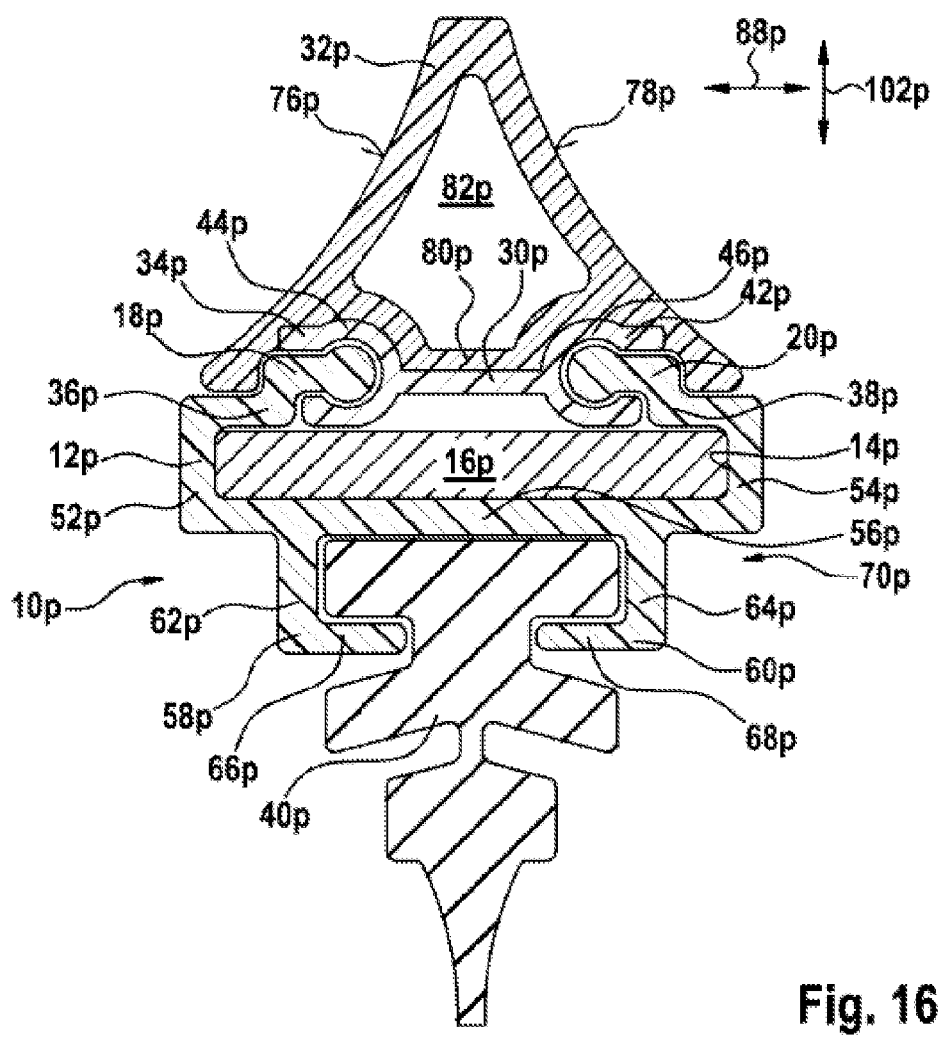
FIG. 16 a cross section view of a further exemplary embodiment of a wiping device with a holding unit.

FIG. 16 shows a cross section view of a further exemplary embodiment of a wiping device according to the invention with a holding unit 10p with a holding element 12p having a longitudinal guidance channel 14p to guide a spring element 16p. The section plane runs perpendicular to a longitudinal direction of the holding element 12p. The wiping device shown substantially corresponds to the exemplary embodiment shown in FIG. 15.

A spoiler unit 22p is formed in a co-extrusion process from two spoiler part elements 32p, 34p of different hardness. The first spoiler part element 32p has two spoiler sides 76p, 78p which are formed concave towards the outside. The softer spoiler part element 32p and the harder spoiler part element 34p are joined together by material fit over a wide area. To reinforce the spoiler unit 22p, the first spoiler part element 32p has a connecting web 80p which joins together the concave spoiler sides 76p, 78p. The softer spoiler part element 32p surrounds a longitudinal channel 82p which has a pentagonal cross section.

The spoiler unit 22p has two fixing means 44p, 46p. The fixing means 44p, 46p each form a C-shaped receiving region and hence a piping rail. The fixing means 44p, 46p are joined together via a second connecting web 30p. The fixing means 44p, 46p and the connecting web 30p are formed integrally.

What is claimed is:

1. A wiping device, with a spoiler unit (22a-22p) produced in a co-extrusion process, wherein the spoiler unit (22a-22p) has two separate harder spoiler part elements (34a-34p) separated from one another by an open gap along a wiping direction (88a) and a softer spoiler part element (32a-32p) coupled to each of the two harder spoiler part elements (34a-34p), and wherein each of the harder spoiler part elements (34a-34p) conceals a respective portion of the softer spoiler part element (32a-32p) along the wiping direction (88a-88p), so that the harder spoiler part elements (34a-34p) protect the softer spoiler part element from damage on opposite sides of the softer spoiler part element along the wiping direction (88a-88p), and further comprising a separate holding element (12a-12p) coupled to the spoiler unit (22d-22p), wherein the holding element (12a-12p) includes a longitudinal guide channel (14a) sized to receive a spring element (16a-16p) along a longitudinal direction, wherein the longitudinal guide channel (14a) is spatially offset from the open gap, such that the entire spoiler unit (22a-22p) is spaced above the longitudinal guide channel (14a) along a vertical direction (102a) that is perpendicular to both the longitudinal direction and the wiping direction (88a), wherein the wiping device further includes a spring element (16a-16p) disposed in the longitudinal guide channel (14a-14p), wherein the entire spring element (16a-16p) is spaced below the spoiler unit (22a-22p) along the vertical direction (102a), and wherein the wiping device further includes a wiper blade connected to the holding element on a side of the holding element opposite the spoiler unit.

2. The wiping device as claimed in claim 1, characterized in that the softer spoiler part element (32a-32i; 32n) has a longitudinal channel (82a-82i; 82n) with a triangular cross section.

3. The wiping device as claimed in claim 1, characterized in that the softer spoiler part element (32b; 32c) and the harder spoiler element (34b; 34c) are joined together by material fit over a wide area in a plane (86b; 86c) which runs parallel to a wiping direction (88b-88c).

4. The wiping device as claimed in claim 1, characterized in that the spoiler unit (22d-22h; 22n) lies at least partly laterally on the holding element (12d-12h; 12n) in a region of the longitudinal guide channel (14d-14h; 14n).

5. The wiping device as claimed in 1, wherein the spoiler unit (22a-22p) is symmetrical about an axis (102a-102p) that extends perpendicular to the wiping direction.

6. The wiping device as claimed in claim 5, wherein interfaces between the harder spoiler part elements (34a-34p) and the softer spoiler part element (32a-32p) define planes that extend at oblique angles relative to the wiping direction.

7. The wiping device as claimed in claim 6, wherein the planes form a "V"-shape.

8. The wiping device as claimed in claim 1, wherein a plane extends along the wiping direction (88a-88p), wherein the plane passes through one of the harder spoiler part elements (34a-34p), then through the softer spoiler part element (32a-32p), and then through the other harder spoiler part element (34a-34p) moving along the wiping direction (88a-88p).

9. The wiping device as claimed in claim 8, wherein the spoiler unit (22a-22p) is symmetrical about an axis (102a-102p) that is perpendicular to the plane.

10. The wiping device as claimed in claim 1, wherein the wiping direction (88a-88p) extends through a portion of each of the harder spoiler part element (34a-34p) and the softer spoiler part element (32a-32p).

11. The wiping device as claimed in claim 1, wherein the holding element (12a-12p) includes side walls (52a, 54a) and channel walls (36a, 38a) that extend perpendicular to the side walls (52a, 54a), wherein the side walls (52a, 54a) and the channel walls (36a, 38a) define boundaries of the longitudinal guide channel (14a) and are configured to guide the spring element (16a-16p) in the longitudinal guide channel (14a).

12. The wiping device as claimed in claim 11, wherein the holding element (12a-12p) includes two L-shaped fixing elements (18a, 20a) that extend from the channel walls (36a, 38a), wherein portions of the fixing elements (18a, 20a) are received in the spoiler unit (22a-22p).

* * * * *